(12) United States Patent
Lloyd

(10) Patent No.: US 9,091,269 B2
(45) Date of Patent: Jul. 28, 2015

(54) GENERATION AND USE OF HIGH PRESSURE AIR

(75) Inventor: Robert Lloyd, Galston (AU)

(73) Assignee: Windfuel Mills Pty Ltd, Sydney (AU)

( * ) Notice: Subject to any disclaimer, the term of this patent is extended or adjusted under 35 U.S.C. 154(b) by 1130 days.

(21) Appl. No.: 13/003,194

(22) PCT Filed: Jul. 9, 2009

(86) PCT No.: PCT/AU2009/000887
§ 371 (c)(1),
(2), (4) Date: Apr. 18, 2011

(87) PCT Pub. No.: WO2010/003187
PCT Pub. Date: Jan. 14, 2010

(65) Prior Publication Data
US 2011/0187118 A1    Aug. 4, 2011

(30) Foreign Application Priority Data
Jul. 10, 2008    (AU) .............................. 2008903554

(51) Int. Cl.
*F01K 1/00*    (2006.01)
*F01K 3/00*    (2006.01)
(Continued)

(52) U.S. Cl.
CPC ............ *F04C 18/3442* (2013.01); *F03D 9/006* (2013.01); *F03D 9/007* (2013.01);
(Continued)

(58) Field of Classification Search
USPC .................. 60/659; 290/44, 55; 415/4.1–4.5; 418/30, 31, 253, 255
See application file for complete search history.

(56) References Cited

U.S. PATENT DOCUMENTS 1,099,238 A * 6/1914 Day ................................ 418/17
1,686,532 A * 10/1928 Ronning et al. ................ 418/31
(Continued)

FOREIGN PATENT DOCUMENTS

DE    24 25 091 A1    11/1975
JP    S59 173588 A    10/1984
(Continued)

OTHER PUBLICATIONS

PCT International Search Report, PCT Application No. PCT/AU2009/000887, Oct. 15, 2009, 7 pages.
(Continued)

*Primary Examiner* — Christopher Jetton
(74) *Attorney, Agent, or Firm* — Fenwick & West LLP

(57) ABSTRACT

The invention provides a device for generating high pressure air. The device comprises a block having an external surface and an internal surface, said internal surface defining an internal cavity in said block. A rotor located inside said cavity is capable of rotating about under the influence of wind energy. The block is capable of moving relative to the rotor in a direction orthogonal to the axis of rotation of the rotor so as to vary the position of the rotor within the cavity. A plurality of vanes extend from the rotor, and are coupled to the rotor in such a manner that, in every position that the block is capable of adopting relative to the rotor, the rotor is capable of rotating within the cavity while maintaining a seal between each vane and the internal surface of the block. There is a gas inlet channel and a gas outlet channel on an opposite side of the block to the gas inlet channel. The device also comprises a position controller for causing the block to move relative to the rotor so as to vary the position of the rotor within the cavity.

54 Claims, 19 Drawing Sheets

(51) Int. Cl.
| | | |
|---|---|---|
| *F01C 20/18* | (2006.01) | |
| *F03C 2/00* | (2006.01) | |
| *F03C 4/00* | (2006.01) | |
| *F04C 14/18* | (2006.01) | |
| *B64C 27/32* | (2006.01) | |
| *F04C 18/344* | (2006.01) | |
| *F03D 9/00* | (2006.01) | |
| *F03D 9/02* | (2006.01) | |
| *F04C 23/02* | (2006.01) | |
| *F04C 28/22* | (2006.01) | |
| *F01C 21/08* | (2006.01) | |
| *F04C 14/22* | (2006.01) | |

(52) U.S. Cl.
 CPC ............... *F03D 9/028* (2013.01); *F04C 23/02* (2013.01); *F04C 28/22* (2013.01); *F01C 21/0845* (2013.01); *F04C 14/223* (2013.01); *F05B 2240/218* (2013.01); *Y02E 10/465* (2013.01); *Y02E 10/72* (2013.01); *Y02E 60/15* (2013.01)

(56) References Cited

U.S. PATENT DOCUMENTS

| | | | | |
|---|---|---|---|---|
| 2,159,941 | A | | 5/1939 | Ewart |
| 2,397,346 | A | * | 3/1946 | Gimenez ...................... 416/113 |
| 2,655,997 | A | * | 10/1953 | Peterson ...................... 416/103 |
| 3,008,423 | A | * | 11/1961 | Miller ............................. 418/17 |
| 3,265,009 | A | | 8/1966 | Weis |
| 3,752,605 | A | | 8/1973 | Newton |
| 3,807,912 | A | * | 4/1974 | Keller ............................. 418/31 |
| 3,808,814 | A | * | 5/1974 | Macy, II .......................... 60/487 |
| 4,104,955 | A | | 8/1978 | Murphy |
| 4,259,039 | A | * | 3/1981 | Arnold .......................... 417/220 |
| 4,325,215 | A | * | 4/1982 | Yamamoto ..................... 60/450 |
| 4,344,741 | A | | 8/1982 | Taki |
| 4,447,738 | A | * | 5/1984 | Allison ........................... 290/44 |
| 4,851,723 | A | * | 7/1989 | Barnhardt ...................... 310/54 |
| 5,044,878 | A | * | 9/1991 | Wilhelm ....................... 415/4.2 |
| 5,140,170 | A | * | 8/1992 | Henderson ..................... 290/44 |
| 5,195,871 | A | * | 3/1993 | Hsech-Pen ...................... 416/12 |
| 5,547,590 | A | | 8/1996 | Szabo |
| 5,595,067 | A | * | 1/1997 | Maness .......................... 62/401 |
| 6,022,201 | A | * | 2/2000 | Kasmer ............................. 418/1 |
| 6,672,054 | B2 | * | 1/2004 | Merswolke et al. ........... 60/398 |
| 7,841,831 | B2 | * | 11/2010 | Chen ............................. 416/116 |
| 2008/0121752 | A1 | * | 5/2008 | Chen ............................... 244/13 |

FOREIGN PATENT DOCUMENTS

| | | |
|---|---|---|
| JP | 3-202679 A | 9/1991 |
| RU | 2118702 | 9/1998 |
| RU | 2349793 C2 | 3/2009 |
| WO | WO 2005/026553 A1 | 3/2005 |
| WO | WO 2006/032132 A1 | 3/2006 |
| WO | WO 2008/038638 A1 | 4/2008 |

OTHER PUBLICATIONS

PCT Written Opinion, PCT Application No. PCT/AU2009/000887, Oct. 15, 2009, 10 pages.
PCT International Preliminary Report on Patentability, PCT Application No. PCT/AU2009/000887, Jun. 1, 2010, 14 pages.
European Extended Search Report, European Application No. 09793713.0, May 9, 2014, 7 pages.

* cited by examiner

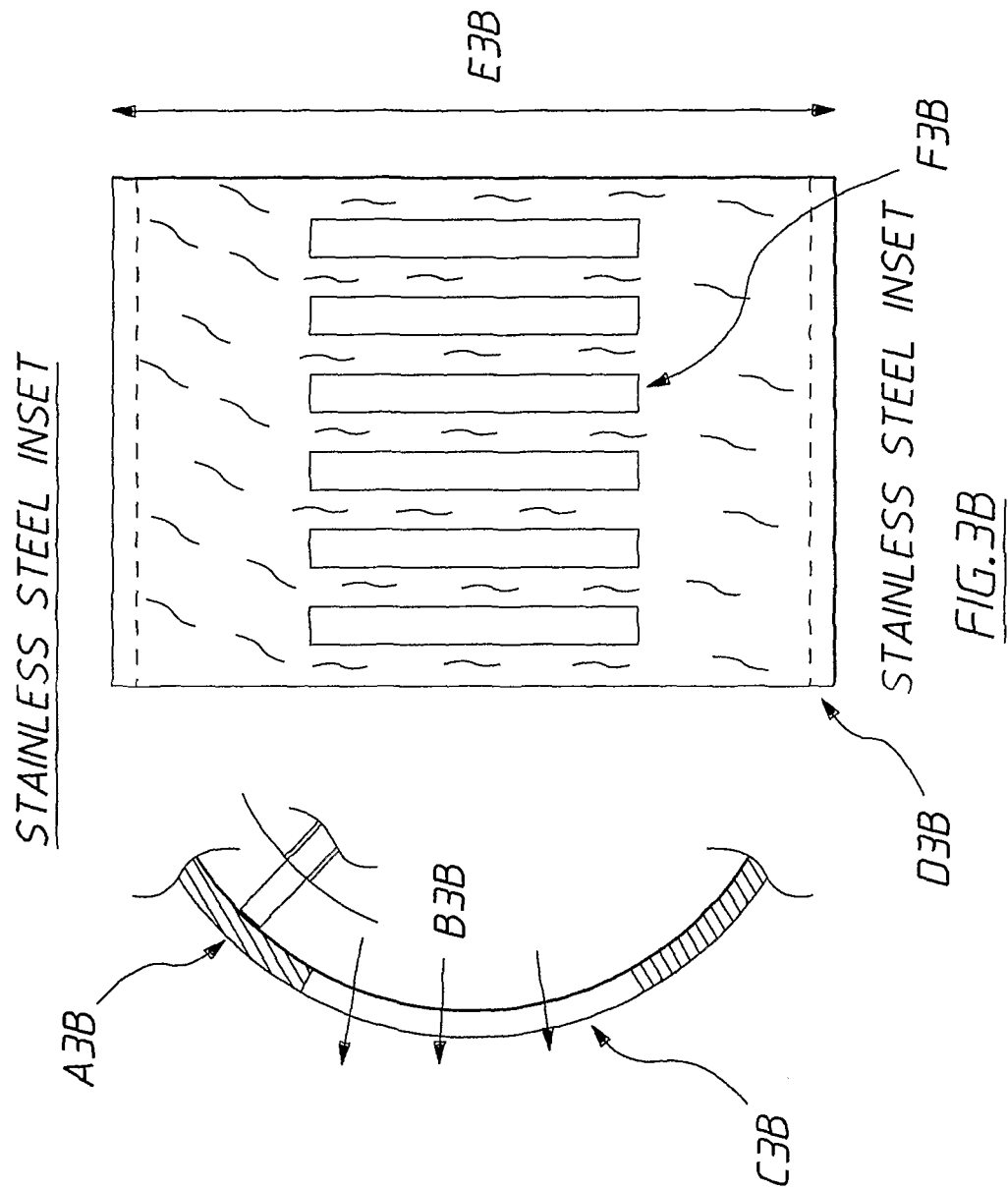

Wind to stored energy systems

GENERATION AND USE OF HIGH PRESSURE AIR

TECHNICAL FIELD

The present invention relates to a device for generation of high pressure air, and to methods of use of the high pressure air.

BACKGROUND OF THE INVENTION

Difficulties have always been encountered in the extraction of sufficient energy due to the following:
 Wind speed commonly varies significantly over an extended period due to weather and temperature variations—variations over a 24 hour period can be substantial, as can variations from season to season;
 Collecting energy efficiently from the wind under these varying conditions over an extended period of time has proven to be difficult;
 For pumping of water with energy from a windmill it has, in the past, been impossible to produce water at sufficient pressure to allow for high pressure storage.

Having extracted energy from wind during the variable periods described above, there is currently no economic technology available to store the energy and reuse it efficiently.

There is therefore a need for a device for extracting energy from wind that addresses the above difficulties.

OBJECT OF THE INVENTION

It is an object of the present invention to substantially overcome or at least ameliorate one or more of the above disadvantages. It is a further object to at least partially satisfy the above need.

SUMMARY OF THE INVENTION

In a first aspect of the invention there is provided a device for generating high pressure air, said device comprising:
 a rotor capable of rotating about an axis of rotation under the influence of wind energy;
 a block having an external surface and an internal surface, said internal surface defining an internal cavity in said block, whereby the rotor is located inside said cavity and is capable of rotating within the cavity, and said block being capable of moving relative to the rotor in a direction orthogonal to the axis of rotation of the rotor so as to vary the position of the rotor within the cavity;
 a plurality of vanes extending from said rotor, said vanes being coupled to the rotor in such a manner that, in every position that the block is capable of adopting relative to the rotor, the rotor is capable of rotating within the cavity while maintaining continuous contact between each vane and the internal surface of the block so as to maintain a seal between the internal surface and the vane;
 a gas inlet channel extending from the external surface of the block to the internal cavity so as to permit a gas to enter the cavity;
 a gas outlet channel on an opposite side of the block to the gas inlet channel, said gas outlet channel extending from the internal cavity to the external surface of the block so as to permit the gas to exit the cavity; and
 a position controller for causing the block to move relative to the rotor so as to vary the position of the rotor within the cavity.

The following options may be used in conjunction with the first aspect, either separately or in any suitable combination.

The position controller may be adapted for causing the block to move relative to the rotor in a direction orthogonal to the axis of rotation of the rotor.

Both the cavity and the rotor may be cylindrical. The axis of the cavity may be parallel to the axis of rotation of the rotor. The axis of the cavity may be non-coincident with the axis of rotation of the rotor. The rotor may be disposed asymmetrically or non-centrally in the cavity. The rotor may be disposed such that rotation of the rotor causes air to be drawn in through the gas inlet channel. It may be disposed such that rotation of the rotor causes air to be expelled through the gas outlet channel. The rotor may be located partially within the cavity, i.e. a portion of the rotor may be located within the cavity. The rotor may extend from inside of the cavity to a location out of the cavity.

The vanes may be capable of at least partly retracting into the rotor. The vanes may comprise a resilient material. The vanes may be resiliently coupled to the rotor.

The rotor may be coupled to a windmill so as to cause the rotor to rotate about the axis of rotation. It may be coupled to the windmill by means of a drive shaft which is coupled axially to the rotor.

The position controller may comprise a first position adjustor for moving the block so as to vary the position of the rotor within the cavity such that, when the pressure in the outlet channel is below a predetermined maximum, the distance between the axis of rotation of the rotor and the centre of the cavity increases with an increase in said pressure in the outlet channel. The device may be such that the first position adjustor urges the block in a first direction such that the distance between the axis of rotation of the rotor and the centre of the cavity increases and the position controller may comprise a second position adjustor which urges the block in a second direction which is opposite to the first direction, such that the first and second position adjustors operate in opposition to one another such that, when the pressure in the outlet is below a predetermined maximum, the distance between the axis of rotation of the rotor and the centre of the cavity increases with an increase in said pressure in the outlet.

The position controller may comprise a tube which couples the outlet channel to the first position adjustor for providing a gas pressure to the first position adjustor so as to control said first position adjustor.

The outlet channel may comprise a pressure regulator for setting a maximum outlet gas pressure from the device.

The inlet and outlet channels may each, independently, comprise one or more slots so as to allow the vanes to pass said channels without restriction to their movement by said channels. The one or more slots may be oriented circumferentially.

The device may comprise a dewatering device for dewatering the gas prior to said gas entering the cavity. It may comprise a particle filter to prevent particulate matter entering the cavity with the gas.

The block may be coupled to a guide. The guide may be capable of constraining the motion of the block to the direction orthogonal to the axis of rotation of the rotor. The guide may be in a fixed position relative to the axis of rotation of the rotor. The guide may comprise a housing. The housing may have an outside surface and an inside surface, said inside surface defining a chamber inside which the block is located. The shape of the chamber may be such that the inside surface constrains the motion of the block to the direction orthogonal to the axis of rotation of the rotor. The housing may have a housing inlet channel extending from the outside surface of the block to the chamber and a housing outlet channel on an opposite side of the housing to the housing inlet channel, said housing outlet channel extending from the chamber to the outside surface so that, in every position that the block is capable of adopting relative to the rotor, said housing inlet channel at least partially aligns with the gas inlet channel so as to permit a gas to enter the cavity and said housing outlet channel at least partially aligns with the gas outlet channel so as to permit the gas to exit the cavity. The housing inlet channel and the housing outlet channel may each, independently, open to the chamber through a slot so as to achieve this.

The device may comprise an inlet pipe and an outlet pipe. The inlet pipe may be in gas communication with the gas inlet channel. The outlet pipe may be in gas communication with the gas outlet channel.

The device may be capable of generating a pressure of at least about 5 to about 50 atmospheres, or about 5 to 25, 5 to 20, 5 to 15, 5 to 10, 10 to 50, 20 to 50, 10 to 30, 10 to 20 or 2 to 40 atmospheres, e.g. about 5, 10, 15, 20, 25, 30, 35, 40, 45 or 50 atmospheres. The pressure may depend on the size of the device.

In an embodiment there is provided a device for generating high pressure air, said device comprising:
- a cylindrical rotor capable of rotating about an axis of rotation under the influence of wind energy;
- a block having an external surface and an internal surface, said internal surface defining a cylindrical internal cavity in said block, whereby the rotor is located inside said cavity and is capable of rotating within the cavity, and said block being capable of moving relative to the rotor in a direction orthogonal to the axis of rotation of the rotor so as to vary the position of the rotor within the cavity;
- a plurality of vanes extending from said rotor, said vanes being coupled to the rotor in such a manner that, in every position that the block is capable of adopting relative to the rotor, the rotor is capable of rotating within the cavity while maintaining continuous contact between each vane and the internal surface of the block so as to maintain a seal between the internal surface and the vane;
- a gas inlet channel extending from the external surface of the block to the internal cavity so as to permit a gas to enter the cavity;
- a gas outlet channel on an opposite side of the block to the gas inlet channel, said gas outlet channel extending from the internal cavity to the external surface of the block so as to permit the gas to exit the cavity; and
- a position controller for causing the block to move relative to the rotor in a direction orthogonal to the axis of rotation of the rotor so as to vary the position of the rotor within the cavity, said position controller comprising a first position adjustor for moving the block so as to vary the position of the rotor within the cavity such that, when the pressure in the outlet channel is below a predetermined maximum, the distance between the axis of rotation of the rotor and the centre of the cavity increases with an increase in said pressure in the outlet channel.

In another embodiment there is provided a device for generating high pressure air, said device comprising:
- a cylindrical rotor capable of rotating about an axis of rotation under the influence of wind energy;
- a block having an external surface and an internal surface, said internal surface defining a cylindrical internal cavity in said block, whereby the rotor is located inside said cavity and is capable of rotating within the cavity, and said block being capable of moving relative to the rotor in a direction orthogonal to the axis of rotation of the rotor so as to vary the position of the rotor within the cavity;
- a plurality of vanes extending from said rotor, said vanes being coupled to the rotor in such a manner that, in every position that the block is capable of adopting relative to the rotor, the rotor is capable of rotating within the cavity while maintaining continuous contact between each vane and the internal surface of the block so as to maintain a seal between the internal surface and the vane;
- a gas inlet channel extending from the external surface of the block to the internal cavity so as to permit a gas to enter the cavity;
- a gas outlet channel on an opposite side of the block to the gas inlet channel, said gas outlet channel extending from the internal cavity to the external surface of the block so as to permit the gas to exit the cavity;
- a position controller for causing the block to move relative to the rotor in a direction orthogonal to the axis of rotation of the rotor so as to vary the position of the rotor within the cavity, said position controller comprising a first position adjustor for moving the block so as to vary the position of the rotor within the cavity such that, when the pressure in the outlet channel is below a predetermined maximum, the distance between the axis of rotation of the rotor and the centre of the cavity increases with an increase in said pressure in the outlet channel; and
- a housing having an outside surface and an inside surface, said inside surface defining a chamber inside which the block is located, wherein the shape of the chamber is such that the inside surface constrains the motion of the block to the direction orthogonal to the axis of rotation of the rotor and wherein the housing has a housing inlet channel extending from the outside surface of the block to the chamber and a housing outlet channel on an opposite side of the housing to the housing inlet channel, said housing outlet channel extending from the chamber to the outside surface so that, in every position that the block is capable of adopting relative to the rotor, said housing inlet channel at least partially aligns with the gas inlet channel so as to permit a gas to enter the cavity and said housing outlet channel at least partially aligns with the gas outlet channel so as to permit the gas to exit the cavity.

In another embodiment there is provided a device for generating high pressure air, said device comprising:
- a cylindrical rotor capable of rotating about an axis of rotation under the influence of wind energy;
- a windmill coupled to said rotor by means of a drive shaft which is coupled axially to the rotor so as to enable the rotor to rotate about the axis of rotation;
- a block having an external surface and an internal surface, said internal surface defining a cylindrical internal cavity in said block, whereby the rotor is located inside said cavity and is capable of rotating within the cavity, and said block being capable of moving relative to the rotor in a direction orthogonal to the axis of rotation of the rotor so as to vary the position of the rotor within the cavity;
- a plurality of vanes extending from said rotor, said vanes being coupled to the rotor in such a manner that, in every position that the block is capable of adopting relative to the rotor, the rotor is capable of rotating within the cavity while maintaining continuous contact between each vane and the internal surface of the block so as to maintain a seal between the internal surface and the vane;

a gas inlet channel extending from the external surface of the block to the internal cavity so as to permit a gas to enter the cavity;

a gas outlet channel on an opposite side of the block to the gas inlet channel, said gas outlet channel extending from the internal cavity to the external surface of the block so as to permit the gas to exit the cavity;

a position controller for causing the block to move relative to the rotor in a direction orthogonal to the axis of rotation of the rotor so as to vary the position of the rotor within the cavity, said position controller comprising a first position adjustor for moving the block so as to vary the position of the rotor within the cavity such that, when the pressure in the outlet channel is below a predetermined maximum, the distance between the axis of rotation of the rotor and the centre of the cavity increases with an increase in said pressure in the outlet channel; and a housing having an outside surface and an inside surface, said inside surface defining a chamber inside which the block is located, wherein the shape of the chamber is such that the inside surface constrains the motion of the block to the direction orthogonal to the axis of rotation of the rotor and wherein the housing has a housing inlet channel extending from the outside surface of the block to the chamber and a housing outlet channel on an opposite side of the housing to the housing inlet channel, said housing outlet channel extending from the chamber to the outside surface so that, in every position that the block is capable of adopting relative to the rotor, said housing inlet channel at least partially aligns with the gas inlet channel so as to permit a gas to enter the cavity and said housing outlet channel at least partially aligns with the gas outlet channel so as to permit the gas to exit the cavity.

In a second aspect of the invention there is provided a pressurised fluid source comprising a device according to the first aspect and a pressure vessel, whereby the gas outlet channel of said device is coupled to an internal space of said pressure vessel so as to permit pressurised gas from the device to enter the internal space.

The following options may be used in conjunction with the second aspect, either individually or in any suitable combination.

The pressure vessel may comprise a liquid inlet for supplying a liquid to an internal space of the pressure vessel, a liquid outlet for allowing the liquid to exit the pressure vessel and at least one valve for controlling the exit of fluid, e.g. liquid, from the pressure vessel, so that the pressurised fluid source is a source of the liquid under pressure.

The pressurised fluid source may comprise a first and a second pressure vessel, whereby the gas outlet channel of said device is coupled via a valve to an internal space of each of said pressure vessels so as to permit pressurised gas from the device to enter the internal space of either the first or the second pressure vessel according to a setting of the valve. Each pressure vessel may comprise a liquid inlet for supplying a liquid to an internal space of said pressure vessel, a liquid outlet for allowing the liquid to exit the pressure vessel and at least one valve for controlling the exit of fluid, e.g. liquid, from the pressure vessel, so that the pressurised fluid source may be a source of the liquid under pressure.

The pressurised fluid source may additionally comprise a heater for heating the internal space of said pressure vessel, or at least one of the internal spaces of said pressure vessels.

The pressurised fluid source may additionally comprise a heater for heating a liquid or gas after said liquid or gas has exited the pressure vessel(s).

In a third aspect of the invention there is provided a motor comprising an engine capable of being run by means of a pressurised fluid and a pressurised fluid source according to the second aspect, said engine being coupled to the pressurised fluid source so as to provide pressurised fluid to the engine. The engine may be a cylinder engine. It may be a reciprocating engine. It may be a rotary engine. It may be a converted diesel engine.

In a fourth aspect of the invention there is provided a water supply system comprising a pressurised fluid source according to the second aspect and a pressure driven water purification device, wherein the liquid outlet(s) is (are) coupled to the pressure driven water purification device.

The water purification system may comprise an activated carbon filter, an activated silica filter, a reverse osmosis device, an ultrafiltration device, a microfiltration device or a combination of any two or more of these.

In a fifth aspect of the invention there is provided a cooling device comprising a pressurised fluid source according to the second aspect and a heat removal device for removing heat from compressed gas in the pressure vessel(s), and also comprising one or more gas outlets for allowing cooled compressed gas to exit the pressure vessel(s) and expand.

In a sixth aspect of the invention there is provided a method for operating a device according to the first aspect, said method comprising allowing wind energy to cause the rotor to rotate, thereby causing the vanes to propel a gas from the gas inlet channel to the gas outlet channel and thereby compress said gas.

The step of allowing may comprise exposing an apparatus to the wind, said apparatus being capable of rotating under the influence of wind and said apparatus being coupled to the rotor, so as to cause the rotor to rotate. The apparatus may be, or may comprise, a windmill. The device may be coupled to a windmill so as to enable said rotor to rotate about the axis of rotation, wherein the step of allowing wind energy to cause the rotor to rotate may comprise exposing said windmill to wind, thereby causing the rotor to rotate about the axis of rotation.

In a seventh aspect of the invention there is provided a method of operating a pressurised fluid source according to the second aspect, said method comprising:

allowing wind energy to cause the rotor to rotate, thereby causing the vanes to propel a gas from the gas inlet channel to the gas outlet channel and thereby compress said gas; and passing the compressed gas to the internal space of the pressure vessel.

The method may additionally comprise heating the compressed gas.

The step of allowing may comprise exposing an apparatus to the wind, said apparatus being capable of rotating under the influence of wind and said apparatus being coupled to the rotor, so as to cause the rotor to rotate. The apparatus may be, or may comprise, a windmill. The method may be for supplying a pressurised liquid, whereby the liquid is in the internal space of the pressure vessel and the step of passing the compressed gas to the internal space comprises applying a gas pressure to the liquid so as to pressurise the liquid. An advantage of using the method for flammable liquids is that no source of ignition is provided in the method in contact with the liquid or its vapour.

In an eighth aspect of the invention there is provided a method of operating a motor according to the third aspect, said method comprising:

allowing wind energy to cause the rotor to rotate, thereby causing the vanes to propel a gas from the gas inlet channel to the gas outlet channel and thereby compress said gas;

passing the compressed gas to the internal space of the pressure vessel; and passing the compressed gas from the pressure vessel to the motor so as to operate the motor.

The step of allowing may comprise exposing an apparatus to the wind, said apparatus being capable of rotating under the influence of wind and said apparatus being coupled to the rotor, so as to cause the rotor to rotate. The apparatus may be, or may comprise, a windmill.

In a ninth aspect of the invention there is provided a method for providing water, said method comprising:

providing a water supply system according to the fourth aspect;

admitting water to the pressure vessel of said system;

allowing wind energy to cause the rotor to rotate, thereby causing the vanes to propel a gas from the gas inlet channel to the gas outlet channel and thereby compress said gas;

passing the compressed gas to the internal space of the pressure vessel so as to pressurise the water in said pressure vessel; and allowing the pressurised water to pass out of the pressure vessel and through the pressure driven water purification device.

It will be appreciated that the method of the ninth aspect may be applied to other liquids than water and this aspect applies equally to those. Thus this aspect also provides a method for providing a liquid, said method comprising:

providing a liquid supply system according to the fourth aspect;

admitting the liquid to the pressure vessel of said system;

allowing wind energy to cause the rotor to rotate, thereby causing the vanes to propel a gas from the gas inlet channel to the gas outlet channel and thereby compress said gas;

passing the compressed gas to the internal space of the pressure vessel so as to compress the liquid in said pressure vessel; and allowing the pressurised liquid to pass out of the pressure vessel and through the pressure driven water purification device.

In a tenth aspect of the invention there is provided a method for providing cool air comprising:

providing a cooling device according to the fifth aspect;

allowing wind energy to cause the rotor to rotate, thereby causing the vanes to propel a gas from the gas inlet channel to the gas outlet channel and thereby compress said gas;

passing the compressed gas to the internal space of the pressure vessel;

removing heat from said compressed gas using the heat removal device;

allowing the cooled compressed gas to exit the pressure vessel through the one or more gas outlets, thereby allowing the gas to expand and cool.

The step of allowing may comprise exposing an apparatus to the wind, said apparatus being capable of rotating under the influence of wind and said apparatus being coupled to the rotor, so as to cause the rotor to rotate. The apparatus may be, or may comprise, a windmill. The step of allowing the cooled compressed gas to exit the pressure vessel may comprise opening at least one of the one or more gas outlets so as to allow the cooled compressed gas to exit the pressure vessel through said opened outlet(s).

In an eleventh aspect of the invention there is provided use of a device for generating high pressure air according to the first aspect for providing high pressure air, or for providing high pressure water, or for purifying water or for cooling.

In a twelfth aspect of the invention there is provided a windmill for collecting wind energy comprising a rotatable shaft and a vane assembly disposed circumferentially around said shaft and coupled to said shaft such that rotation of the vane assembly causes rotation of the shaft, wherein the vane assembly comprises:

at least one vane, the or each vane having an axis which extends outwardly from the shaft; and a rotation mechanism such that when a vane of the vane assembly rotates through a first position said vane rotates about its axis so that the vane is in a substantially vertical plane and when said vane rotates through a second position it rotates about its axis by about 90°, wherein the first and second positions are located approximately 180° apart around the shaft.

The following options may be used in conjunction with the twelfth aspect, either individually or in any suitable combination.

The shaft may be fixed to the vane assembly such that the two corotate.

The axis of the vane, or of each vane, may be substantially orthogonal to the shaft.

The rotation mechanism may be coupled to a region of each vane at or near a proximal end of said vane. It may comprise a cam.

In use, the vane assembly may rotate in a plane substantially parallel to the wind direction, i.e. the vector of the wind direction may lie in the plane of rotation of the vane assembly. In this context, the plane of rotation of the wind assembly may be considered to be the plane in which the distal end of the vane (or distal ends of the vanes) rotates. In the event that the vane is, or vanes are, orthogonal to the shaft, this will be a plane in which the entire vane(s) rotate(s), however in the event that the vane(s) is (are) not orthogonal to the shaft, the rotating vane(s) will describe a conical surface rather than a plane as it (they) rotate(s) and the plane of rotation may then be taken to be the plane of the circle described by the vane(s) as it (they) rotate(s). The plane of rotation of the vane assembly may be substantially horizontal.

The windmill may additionally comprise a direction unit capable of detecting the wind direction and of rotating at least a portion of the windmill so that each vane when travelling in a leeward direction (i.e. in the direction of the wind) is located in a substantially vertical plane and when travelling in a windward direction (i.e. into the wind) lies in a plane substantially orthogonal to said substantially vertical plane. The direction unit may comprise a wind vane. Alternatively it may comprise a wind direction detector coupled to a motor, which is in turn coupled to the windmill so as to be capable of rotating at least a portion of the windmill.

The windmill may comprise a second vane assembly coupled to the vane assembly described above (hereinafter "the first vane assembly"). The second vane assembly may comprise at least one second assembly vane having an axis which extends outwardly from an axis of rotation of said second vane assembly, and a rotation mechanism. The rotation mechanism is such that when a vane of the second vane assembly rotates through a third position said vane rotates about its axis so that the vane is in a substantially vertical plane and when said vane rotates through a fourth position it rotates about its axis by about 90°, wherein the third and fourth positions are located approximately 180° apart around the shaft. The coupling of the second vane assembly to the first vane assembly may be such that, in use, rotation of the second vane assembly transfers energy to the shaft.

The second vane assembly may be located substantially parallel to the first vane assembly. It may be located coaxially therewith. In this case, the axes of rotation of the first and second vane assemblies may coincide. This axis of rotation of the vane assemblies may also coincide with the axis of rotation of the shaft.

The planes of rotation of the first and second vane assemblies may be substantially parallel. The second vane assembly may be located above the first vane assembly. In some embodiments the second vane assembly is located below the first vane assembly.

The second vane assembly may be coupled to the first vane assembly by means of a coupling for transferring rotational energy from the second vane assembly to the first vane assembly. The second vane assembly may be capable of rotating in an opposite direction to the first vane assembly, and in use may do so. The coupling may comprise one or more rollers and/or one or more cogwheels.

The vane(s) of the first vane assembly may have a cross-section in the shape of an aerofoil. In this event, rotation of the first vane assembly may direct air upwards towards the second vane assembly, in particular towards the vane(s) of the second vane assembly. The vane(s) of the second vane assembly may have a cross-section in the shape of an inverted aerofoil. In this event, rotation of the second vane assembly may direct air downwards towards the first vane assembly, in particular towards the vane(s) of the first vane assembly.

The rotation mechanism of the second vane assembly may comprise a cam.

The first vane assembly may have at least two vanes. The at least two vanes of the first vane assembly may be distributed symmetrically around the shaft. The second vane assembly may have at least two vanes. The at least two vanes of the second vane assembly may be distributed symmetrically around its axis of rotation.

The shaft of the windmill may be coupled to a generator for generating electricity.

In a thirteenth aspect of the invention there is provided a device of the first aspect coupled to the windmill described above. Thus the invention provides a device according to the first aspect wherein the rotor is coupled to a windmill as described above such that rotation of the shaft causes rotation of the rotor. The shaft of the windmill may be the same as, or may be an extension of, the rotor of the device, or may be coupled thereto, e.g. by means of a gearbox, interlocking cogwheels or other suitable coupling. Any one or more of the options described earlier in connection with the first aspect may also be used in this device.

In a fourteenth aspect of the invention there is provided a pressurised fluid source comprising a device according to the thirteenth aspect and a pressure vessel, whereby the gas outlet channel of said device is coupled to an internal space of said pressure vessel so as to permit pressurised gas from the device to enter the internal space.

In a fifteenth aspect of the invention there is provided a motor comprising an engine capable of being run by means of a pressurised fluid and a pressurised fluid source according to the fourteenth aspect, said engine being coupled to the pressurised fluid source so as to provide pressurised fluid to the engine.

In a sixteenth aspect of the invention there is provided a water supply system comprising a pressurised fluid source according to the fourteenth aspect and a pressure driven water purification device, wherein the liquid outlet(s) is (are) coupled to the pressure driven water purification device.

In a seventeenth aspect of the invention there is provided a cooling device comprising a pressurised fluid source according to the fourteenth aspect and a heat removal device for removing heat from compressed gas in the pressure vessel(s), and also comprising one or more gas outlets for allowing cooled compressed gas to exit the pressure vessel(s) and expand.

In an eighteenth aspect of the invention there is provided a method for operating a device according to thirteenth aspect, said method comprising allowing wind energy to cause the rotor to rotate, thereby causing the vanes to propel a gas from the gas inlet channel to the gas outlet channel and thereby compress said gas. The step of allowing wind energy to cause the rotor to rotate may comprise allowing wind energy to cause the vane assembly of the windmill to rotate about the shaft of the windmill, thereby causing the rotor to rotate. It may comprise exposing the vane assembly to wind so as to cause it to rotate about the shaft of the windmill. The rotation of the rotor due to the rotation of the shaft may be due to a coupling between the rotor and the shaft, or may be due to the rotor being an extension of the shaft.

In a nineteenth aspect of the invention there is provided a method of operating a pressurised fluid source according to the fourteenth aspect comprising:
  allowing wind energy to cause the rotor to rotate, thereby causing the vanes to propel a gas from the gas inlet channel to the gas outlet channel and thereby compress said gas; and
  passing the compressed gas to the internal space of the pressure vessel.

The step of allowing wind energy to cause the rotor to rotate may comprise allowing wind energy to cause the vane assembly of the windmill to rotate about the shaft of the windmill, thereby causing the rotor to rotate. It may comprise exposing the vane assembly to wind so as to cause it to rotate about the shaft of the windmill. The rotation of the rotor due to the rotation of the shaft may be due to a coupling between the rotor and the shaft, or may be due to the rotor being an extension of the shaft.

In a twentieth aspect of the invention there is provided method of operating a motor according to the fifteenth aspect, said method comprising:
  allowing wind energy to cause the rotor to rotate, thereby causing the vanes to propel a gas from the gas inlet channel to the gas outlet channel and thereby compress said gas;
  passing the compressed gas to the internal space of the pressure vessel; and
  passing the compressed gas from the pressure vessel to the engine so as to operate the motor.

The step of allowing wind energy to cause the rotor to rotate may comprise allowing wind energy to cause the vane assembly of the windmill to rotate about the shaft of the windmill, thereby causing the rotor to rotate. It may comprise exposing the vane assembly to wind so as to cause it to rotate about the shaft of the windmill. The rotation of the rotor due to the rotation of the shaft may be due to a coupling between the rotor and the shaft, or may be due to the rotor being an extension of the shaft.

In a twenty first aspect of the invention there is provided a method for providing water, said method comprising:

providing a water supply system according to the sixteenth aspect;

admitting water to the pressure vessel of said system;

allowing wind energy to cause the rotor to rotate, thereby causing the vanes to propel a gas from the gas inlet channel to the gas outlet channel and thereby compress said gas;

passing the compressed gas to the internal space of the pressure vessel so as to pressurise the water in said pressure vessel; and allowing the pressurised water to pass out of the pressure vessel and through the pressure driven water purification device.

The step of allowing wind energy to cause the rotor to rotate may comprise allowing wind energy to cause the vane assembly of the windmill to rotate about the shaft of the windmill, thereby causing the rotor to rotate. It may comprise exposing the vane assembly to wind so as to cause it to rotate about the shaft of the windmill. The rotation of the rotor due to the rotation of the shaft may be due to a coupling between the rotor and the shaft, or may be due to the rotor being an extension of the shaft.

In a twenty second aspect of the invention there is provided a method for providing cool air comprising:

providing a cooling device according to the seventeenth aspect;

allowing wind energy to cause the rotor to rotate, thereby causing the vanes to propel a gas from the gas inlet channel to the gas outlet channel and thereby compress said gas;

passing the compressed gas to the internal space of the pressure vessel;

removing heat from said compressed gas using the heat removal device;

opening at least one of the one or more gas outlets so as to allow the cooled compressed gas to exit the pressure vessel through said opened outlet(s), thereby allowing the gas to expand and cool.

The step of allowing wind energy to cause the rotor to rotate may comprise allowing wind energy to cause the vane assembly of the windmill to rotate about the shaft of the windmill, thereby causing the rotor to rotate. It may comprise exposing the vane assembly to wind so as to cause it to rotate about the shaft of the windmill. The rotation of the rotor due to the rotation of the shaft may be due to a coupling between the rotor and the shaft, or may be due to the rotor being an extension of the shaft.

In a twenty third aspect of the invention there is provided use of a device for generating high pressure air according to the thirteenth aspect for providing high pressure air, or for providing high pressure water, or for purifying water or for cooling.

DETAILED DESCRIPTION OF THE INVENTION

The present invention provides a device which is controlled by the energy available in the wind at any particular time. The compression system of rotating vanes disclosed herein is capable of automatically adjusting so as to compress a quantity of air in accordance with the available energy provided to the rotor, e.g. from the drive shaft of a windmill. Design of the device, for example diameter and volume of the cavity, diameter of the rotor and the ratio of the diameters of the rotor and the cavity, mass of the rotor, number of vanes, spacings between the vanes etc. may be such as to achieve the desired pressure output.

An important aspect of the present invention is its ability to address the problem of storing energy for long periods of time so that the energy can be used as and when required. Standard high pressure reinforced and rubber lined pipes are in commercial use around the world, and can be used for storage of large quantities of compressed air. This storage represents the storage of correspondingly large quantities of energy.

Many forms of energy may be used for compressing the air. Gas turbines generators (electric systems) use much of their energy to compress the air. If compressed air is made available from wind power as described herein, storage gas turbine generation can be made to economically supply energy to towns and cities without large energy transmission costs.

Integers of the device of the first aspect are described in further detail below.

Rotor: This is coupled to a source of energy capable of causing the rotor to rotate. It will be readily appreciated that, whereas the invention is primarily directed to a rotor driven by wind energy, other sources of energy may be used. A benefit of the present invention lies in the ability to provide a constant pressure output from a variable energy input. Thus the energy source may be any variable source of energy, for example wind, water, tide etc. It is particularly suitable for use with wind energy due to the fact that wind speeds may fluctuate significantly and unpredictably over short periods of time, e.g. over periods of seconds to minutes.

The rotor may constitute, or be coupled to, a portion of a drive shaft which is coupled to the source of energy. Thus for example the drive shaft may be coupled to the rotor, and may have the vanes of a windmill attached thereto, so that wind causes rotation of the drive shaft, and therefore causes rotation of the rotor. A suitable source of wind energy is a windmill. The coupling may be direct (i.e. blades of a wind turbine etc. may be attached to a shaft which is fixed to the rotor) or it may be indirectly coupled through a coupling. It may be coupled through a gearing device. The gearing device may be designed to gear the power up or gear it down or gear it either up or down. It may be a fixed gearing ratio or it may be a variable gearing ratio. The rotor may comprise a plurality of recesses into which the vanes of the device are set (see below), each of said recesses being fitted with one of said vanes.

The rotor may be located asymmetrically, or non-centrally, in the cavity. In this way, rotation of the rotor causes expansion and contraction of regions of the cavity between any two successive vanes. In particular, as one of said regions is open to the outlet channel, it contracts in volume as the rotor rotates due to the asymmetry of the location of the rotor, causing a portion of the gas in that region to be expelled through the outlet channel. Similarly, as one of said regions is open to the inlet channel, it expands in volume as the rotor rotates, thereby causing gas to be drawn into the cavity from the inlet channel. The asymmetry of the location of the rotor in the cavity may be seen in FIGS. 1 and 2. Thus viewing a cross-section of the device as shown in FIGS. 1 and 2, the rotor is located asymmetrically with regard to an axis joining the inlet and outlet channels, although it may be located symmetrically with regard to an axis orthogonal to the axis joining the inlet and outlet channels. In many embodiments, the inlet and outlet channels are disposed diametrically opposite one another, although in other embodiments this may not be the case. In certain embodiments the inlet channel communicates with the cavity in a location in which the volume of the cavity between any two vanes is a maximum, and the outlet channel communicates with the cavity in a location in which the volume of the cavity between any two vanes is a minimum. This ensures maximum intake of gas through the inlet channel and maximum compression at the outlet channel.

In operation the rotor may turn at a rate of between about 100 and about 10000 rpm, or about 100 to 5000, 100 to 1000, 100 to 500, 500 to 10000, 1000 to 10000, 2000 to 10000, 5000 to 10000, 500 to 5000, 500 to 2000 or 1000 to 5000 rpm, e.g. about 100, 200, 300, 400, 500, 600, 700, 800, 900, 1000, 1500, 2000, 2500, 3000, 3500, 4000, 450, 5000, 6000, 7000, 8000, 9000 or 10000 rpm, although in some cases it may rotate at less than 100 or at more than 10000 rpm.

Vanes: A plurality of vanes extend radially from the rotor. There may be between 2 and 10 vanes, or may be more than 10 vanes. There may be 2, 3, 4, 5, 6, 7, 8, 9 or 10 vanes. These may be disposed equidistantly around the circumference of the rotor or may be disposed non-equidistantly around the circumference of the rotor. The vanes may each be resiliently coupled to the rotor. They may be coupled thereto by means of a resilient coupling. They may be set into recesses in the rotor. In this event, the resilient coupling may be located in said recesses. In the present specification the term "resilient" may be defined as "capable of returning to an original shape or position, as after having been compressed" (http://www.thefreedictionary.com/resilient), and "resiliently" as "in a resilient fashion". The resilience of the coupling may be provided by a mechanical spring, or by a chamber comprising a compressible gas, or by some other suitable resilient means. In some embodiments the resilient coupling urges the vanes outwards from the rotor so that the vanes contact the surface of the block. Additionally or alternatively, the vanes may be resilient vanes. They may be compressible vanes. For example the vanes may be capable of expanding and contracting, e.g. by a concertina-like mechanism, so as to continually contact the inner surface of the block. The vanes are so shaped that they seal against said surface. They may be shaped and disposed so that the distal ends of the vanes contact the internal surface of the block and seal thereagainst. In this manner, when the rotor is not coaxial with the cavity, the rotor is capable of rotating within the cavity in such a manner that the vanes continue to contact, for example seal against, the inner surface of the block. In the event that the rotor is not coaxial with the cavity, it is preferred that the axis of the rotor is parallel to the axis of the cavity. The rotor may have a round cross-section or may have some other shape of cross section (e.g. square, pentagonal, hexagonal, octagonal, oval, star-shaped etc.). It may have a constant diameter along its length, or may have a variable diameter along its length. It may for example be cylindrical, or may be barrel-shaped, conical, truncated conical, ellipsoid, spheroid (e.g. prolate spheroid) or some other suitable shape.

FIG. 1 illustrates several means by which the vanes may be kept in constant contact with the internal surface of the block. In FIG. 1A, device 1 has vanes 10 and 12 set into recesses 14 and 16 respectively in rotor 18. Resilient couplings 20 and 22, comprising springs, are set into recesses 14 and 16 respectively for coupling vanes 10 and 12 to rotor 18. In the upper diagram of FIG. 1A, vane 10 is maximally extended from rotor 18, and is urged against the internal surface 24 of block 26. Vane 12 is minimally extended from rotor 18, and is urged against the internal surface 24 of block 26. As rotor 18 rotates clockwise in block 26, device 1 passes through the orientation shown in lower diagram of FIG. 1A. In doing so, it is necessary for vane 10 to partially withdraw into rotor 18, and for vane 12 to partially emerge from rotor 18, so as to maintain contact between the distal ends of those vanes and internal surface 24. This is achieved by the resilient nature of couplings 20 and 22, which urge vanes 10 and 12 respectively outwards so as to continually contact surface 24.

FIG. 1B shows an alternative system. In FIG. 1B, device 2 has vanes 30 and 32 which are non-resiliently coupled to rotor 38. Vanes 30 and 32 are resilient vanes such that they will expand radially so as to contact internal surface 44 of block 46. In the upper diagram of FIG. 1B, vane 30 is maximally extended from rotor 38, and is urged against the internal surface 44 of block 46. Vane 32 is minimally extended from rotor 38, and is urged against the internal surface 44 of block 46. As rotor 38 rotates clockwise in block 46, device 2 passes through the orientation shown in the lower diagram of FIG. 1B. In doing so, it is necessary for vane 30 to contract radially, and for vane 32 to extend radially, so as to maintain contact between the distal ends of those vanes and inner surface 44. This is achieved by the resilient nature of vanes 30 and 32, which expand and contract radially as required so as to continually contact internal surface 44.

FIG. 1C shows an alternative system. In FIG. 1C, device 3 has vanes 50 and 52 which are non-resiliently coupled to rotor 58. Vanes 50 and 52 are resilient vanes such that they are capable of bending and unbending so as to continually contact the internal surface 64 of block 66. In the upper diagram of FIG. 1C, vane 50 is nearly orthogonal to rotor 58, as the distance between rotor 58 and internal surface 64 is maximal. Vane 50 urges against the inner surface 64 of block 66. Vane 52 is maximally bent, to accommodate the minimal distance from rotor 58 to internal surface 64 at that point. Vane 52 urges against the internal surface 64 of block 66. As rotor 58 rotates clockwise in block 66, device 3 passes through the orientation shown in the lower diagram of FIG. 1C. In doing so, it is necessary for vane 50 to unbend so as to accommodate the increased distance from rotor 58 to internal surface 64 at that point, and for vane 52 to bend so as to accommodate the reduced distance from rotor 58 to internal surface 64 at that point. In this way, contact between the distal ends of those vanes and internal surface 64 is maintained. This is achieved by the resilient nature of vanes 50 and 52, which bend or unbend as required so as to continually contact surface 64.

Block: The block has a cavity therein, in which the vanes are located such that, when the rotor rotates, the vanes, commonly the distal ends thereof (i.e. the ends furthest from the rotor), contact the surface of the cavity so as to seal against said surface. The cavity may be defined by a tube in the block, e.g. a stainless steel tube. The cavity commonly has a circular cross-section, which is larger than the largest diameter of the rotor. In some cases however the cavity may have a variable diameter. It may for example be barrel-shaped, conical, truncated conical, ellipsoid, spheroid (e.g. prolate spheroid) or some other suitable shape. The axis of the cavity is preferably parallel to the axis of the rotor, or to the axis of rotation of the rotor. The block may be made of any suitable material. It may be a rigid material for example a metal (e.g. steel, aluminium, titanium etc.) or a rigid plastic (e.g. acrylonitrile butadiene styrene (ABS), polycarbonate (PC), polyamide (PA), polybutylene terephthalate (PBT), polyethylene terephthalate (PET), polyphenylene oxide (PPO), polysulphone (PSU), polyetherketone (PEK), polyetheretherketone (PEEK), polyimides, etc.) or a ceramic. It may have a low friction surface. It may be lined with a low friction material e.g. a fluoropolymer such as PTFE or a non-lubricant ceramic. The block may be located on a guide, which constrains the movement of the block. The guide may for example comprise shafts passing through a portion of the block along which the block can slide, or may comprise one or more rails along which the block can slide, or may comprise a housing within which the block can move. It may be capable of moving within said housing under the influence of the position controller. The guide (or housing) may comprise stops to limit the range of movement of the block. Commonly, if a guide or housing is present, it will be in a fixed orientation with respect to the rotor, so that movement of the block relative to the rotor will also represent movement of the block relative to the guide or housing.

Inlet channel: The inlet channel passes through the block to permit the gas to enter the cavity. It may have a suitably large diameter that it does not substantially impede flow of the gas. That diameter will depend on the size of the device, in particular of the cavity and the rotor. The inlet channel may be fitted with an inlet valve. The inlet valve may allow entry of the gas into the cavity but prevent exit of the gas from the cavity through the inlet. The inlet valve may be a one-way valve. The inlet channel may be connected to a source of the gas. In the event that the gas is air, the inlet channel may be connected to the atmosphere. The inlet channel may be coupled to a dewatering device for dewatering the gas prior to said gas entering the cavity. The dewatering device may comprise a chiller for cooling the gas so as to reduce its water content, or it may comprise a water adsorber or absorber (e.g. a desiccant) for removing water from the gas, or it may comprise both of these. The inlet channel may comprise slots so as to allow air to enter therethrough without impeding movement of the vanes.

Outlet channel: the outlet channel passes through the block to permit the gas to exit the cavity. The outlet may have a suitably large diameter that it does not substantially impede flow of the gas. That diameter will depend on the size of the device, in particular of the cavity and the rotor. The outlet channel may be fitted with an outlet valve. The outlet valve may allow exit of the gas from the cavity but prevent intake of the gas to the cavity through the outlet. The outlet valve may be a one-way valve. It may be an on/off (open/closed) valve. The outlet channel may comprise a pressure regulator. The pressure regulator may be capable of delivering the gas at a predetermined pressure so that gas which leaves the device through the pressure regulator does so at the predetermined pressure (provided that the gas exiting the cavity is at a pressure at least as high as that predetermined pressure). The outlet channel may comprise slots so as to allow air to exit therethrough without impeding movement of the vanes.

In many embodiments, the inlet and outlet channels are disposed diametrically opposite one another, although in other embodiments this may not be the case. In certain embodiments the inlet channel communicates with the cavity in a location in which the volume of the cavity between any two vanes is a maximum, and the outlet channel communicates with the cavity in a location in which the volume of the cavity between any two vanes is a minimum. This ensures maximum intake of gas through the inlet channel and maximum compression at the outlet channel. This is shown in FIG. 1D. Thus in FIG. 1D, rotor 105 and block 120 together with vanes 110a and 110b define region 160a, which communicates with inlet channel 130, and rotor 105 and block 120 together with vanes 110c and 110d define region 160b, which communicates with outlet channel 135. the position of rotor 105 (and hence of vanes 110a to 110d) is such that region 160b is at a minimum (relative to what it would be in other rotational positions of rotor 105) and region 160a is at a maximum. In this way, a maximum amount of air is expelled through outlet channel 135 and a maximum amount of air is drawn in through inlet channel 130. As rotor 105 rotates, region 160b will expand and also will come in communication with inlet channel 130. In doing so, the pressure therein will drop, so as to draw air in through inlet channel 130 once it adopts the position shown for region 160a in FIG. 1D. Similarly, region 160a will contract and will come in communication with outlet channel 135. In doing so, the pressure therein will increase, so as to expel air out through outlet channel 130 once adopts the position shown for region 160b in FIG. 1D.

Position controller: The position controller is coupled to the outlet so as to vary the position of the rotor within the cavity. The greater the energy provided by the source of wind energy, the further the axis of the rotor will be located from the axis of the cavity. This will of course be limited, since the rotor, being located within the cavity, may not be further from the axis of the cavity than permitted by contact of the rotor with the surface of the cavity.

This may be understood with reference to FIG. 2 which shows diagrammatically an embodiment of the present invention. In FIG. 2 (both a and b) device 100 comprises rotor 105 coupled to a source of wind energy (not shown). A plurality of vanes 110 extend radially from rotor 105 and are resiliently coupled thereto. Rotor 105 and vanes 110 are located within cavity 115 in block 120. As rotor 105 rotates within cavity 115, the distal ends of vanes 100 continuously contact surface 125 of cavity 115 so as to seal against it. Inlet channel 130 passes through block 120 to permit air to enter cavity 115, and outlet channel 135 passes through block 120 to permit air to exit cavity 115. Position controller 140 coupled to outlet channel 135 by means of coupling 145 is capable varying the position of rotor 105 within cavity 115. In operation, wind energy causes rotation of rotor 105 under in the direction of arrow 150. This causes vanes 110 to take air from inlet channel 130 in the direction of arrow 155 and propel it out through outlet channel 135 under pressure. As rotor 105 rotates, the volume of air which is located between two successive vanes and is in communication with outlet channel 135 is reduced due to the asymmetric location of rotor 105 in cavity 115. This causes part of that air to pass out through outlet channel 135. Some of the air will be returned in the direction of arrow 160. Once rotor 105 has rotated so that the air between those two vanes communicates with inlet channel 130, the pressure is relatively low, due to the loss of air through outlet channel 135. This causes further air to be drawn in through inlet channel 130. As rotor 105 continues to rotate, the volume of the air increases (again due to the asymmetric location of rotor 105 in cavity 115) so as to draw further air into cavity 115. In diagram a of FIG. 2, rotor 105 is close to the surface of cavity 115, and consequently the amount of air returned in the direction of arrow 160 is small compared to the amount moving forwards in the direction of arrow 155. Consequently a relatively large amount of air will be drawn into cavity 115 and most of the air taken in through inlet channel 130 will be expelled through outlet channel 135. This will be the case when a large amount of wind energy is available to the device. In diagram b of FIG. 2, rotor 105 is near the centre of cavity 115. Consequently the amount of air returning in the direction of arrow 160 will be nearly the same as that moving forwards in the direction of arrow 155, and thus only a small amount of the air will exit through outlet channel 135 and only a relatively small amount of gas will be drawn into inlet channel 130. In diagram a, the small amount of energy is concentrated in a small amount of air exiting cavity 115 and in diagram b, a large amount of energy is concentrated in a large amount of air exiting cavity 115. This enables air with a substantially constant energy to be outputted, although the volume of the air will vary with the amount of energy available from the source of wind energy. Accordingly, it is necessary for position controller 140 to vary the relative positions of rotor 105 and cavity 115 depending on the amount of energy available. The energy available may be detected and a corresponding signal sent by coupling 145 so as to control position controller 140. Thus by varying the position of block 120 in cavity 115, the quantity of air pumped by device 100 may be varied according to the amount of energy available.

In some embodiments the rotor is located in a fixed position and the position controller controls the position of the block (and consequently of the cavity) so as to vary the position of the rotor relative to the cavity. In other embodiments the block is located in a fixed position and the position controller controls the position of the rotor as to vary the position of the rotor relative to the cavity.

The position controller may comprise a first position adjustor for moving the block so as to vary the position of the rotor within the cavity such that, when the pressure in the outlet is below a predetermined maximum, the distance between the axis of rotation of the rotor and the centre of the cavity increases with an increase in said pressure in the outlet. The first position adjustor may comprise a motor. In this event there may be a pressure detector in the outlet which provides a signal (e.g. an electrical or electronic signal) to the motor. Thus when the outlet pressure drops, the motor is signalled to move the rotor towards the centre of the cavity, thereby increasing the outlet pressure while reducing the outlet volume. Correspondingly, when the pressure increases, the pressure detector signals the motor to move towards the surface of the cavity, thereby decreasing the outlet pressure while increasing the outlet volume. Thus by way of feedback from the pressure detector, the position controller controls the relative position of the rotor in the cavity so as to maintain a relatively constant output pressure, with an output volume which varies depending on the available energy. In another example, the first position adjustor may be a pneumatic adjustor and there may be a gas tube leading from the outlet channel to the first position adjustor. If the first position adjustor is located below the block, and the block is movable, then an increase in pressure at the outlet will cause the first position adjustor to propel the block vertically upwards, thereby causing the rotor to approach the surface of the cavity. When the pressure at the outlet (and therefore at the first position adjustor) decreases, the block can drop under gravity, thereby causing the rotor to approach the centre of the cavity. As described above for the case in which the first position adjustor is a motor, this feedback provides for a relatively constant output gas pressure. The position controller may comprise a bleed valve for bleeding gas from the gas tube either to the atmosphere, to the inlet or to some other location. As the bleed valve is closed further, the pressure at the position adjustor due to gas from the gas tube will increase for a particular gas pressure in the outlet channel, and therefore the block will be raised further, leading to an increase in pumping volume. Thus the bleed valve may be used to control the responsiveness of the position controller to outlet pressure.

In some instances a second position adjustor may be provided which operates in opposition to the first position adjustor. This may for example be a spring, or a compressible gas piston or similar resilient device. In this case the second position adjustor serves to return the rotor towards the centre of the cavity when the force provided by the first position adjustor is insufficient. Thus the second position adjustor serves the same purpose as gravity in the earlier description. However when a second position adjustor is provided there is no requirement for a vertical orientation of the chamber.

The outlet channel of the device may be coupled to a pressure vessel so as to provide a pressurised fluid source. The outlet is coupled to an internal space of the pressure vessel so as to permit pressurised gas from the device to enter the internal space. The pressure regulator of the device, if present, should therefore be set to the desired pressure for the pressure vessel, and in any event at a pressure below the safe operating limit pressure of the pressure vessel. Alternatively or additionally the pressure vessel may comprise a pressure relief valve so as to prevent the safe operating pressure of the vessel from being exceeded. Commonly the pressure in the pressure vessel during operation will be about 500 to about 1500 kPa, or about 500 to 1200, 500 to 1000, 500 to 800, 700 to 1500, 1000 to 1500, 1200 to 1500, 700 to 1000, 700 to 900 or 800 to 1000 kPa, e.g. about 500, 600, 700, 800, 900, 1000, 1100, 1200, 1300, 1400 or 1500 kPa. The safe operating limit pressure may be at least 100 kPa above the desired operating pressure of the pressure vessel. It may for example be between about 1000 and about 2000 kPa or higher than 2000 kPa, or between about 1500 and 2000, 1800 and 2000 or 1200 and 1600 kPa. The device should be designed so that its maximum output pressure is at least as great as the target pressure in the pressure vessel.

The pressure vessel may have an outlet valve for allowing the pressurised gas to exit the pressure vessel. In this way the pressurised fluid source serves as a pressurised gas source. This may be used as an energy storage device for storing the wind energy that is provided to the device for providing pressurised gas, since the pressurised gas contains potential energy that may be released as required. This may be used to power an engine, e.g. a vehicle, an electric generator, an air conditioner, a water pump or some other type of engine. On exiting the pressure vessel, or within the pressure vessel, the pressurised gas may be heated. This provides additional energy to the pressurised gas, and therefore more power to an engine to which the pressurised gas is supplied. The pressurised gas may be heated by any suitable heating system. The heating system may be electric, combustion, geothermal, solar or some other suitable type of heating system. In particular the heating system may comprise a heat storage block. The heat storage block may comprise graphite as a heat storage material. It may be heated by solar energy. In this way the solar energy may be stored when available, and may be used as required for heating the pressurised gas. The heating system may also comprise a heat exchanger for transferring the heat energy to the compressed gas. It may have a temperature controller to ensure that the compressed gas is heated to a suitable temperature.

The pressure vessel may be designed to apply gas pressure to a liquid therein. Thus pressurised gas may be supplied to the headspace above liquid in an internal space of the pressure vessel. This pressurised gas may be then used to provide the liquid at pressure, thereby causing the pressurised fluid source to function as a source of pressurised liquid, i.e. a liquid pump. The pressure vessel may comprise a liquid inlet for supplying a liquid to an internal space of the pressure vessel. Thus in operation, the liquid is filled into the internal space of the pressure vessel, which is then sealed. The headspace above the liquid is then connected to the device, thereby pressurising the headspace with the gas. Opening a liquid outlet then allows the liquid to leave the pressure vessel under pressure of the pressurised gas. In some instances the gas may be separated from the headspace by a membrane, preferably a flexible or movable membrane. This may be beneficial in cases where the gas is soluble in the liquid, in order to prevent dissolution of the gas in the liquid. If gas is dissolved under pressure in the liquid, this may come out of solution when the pressure is released as the liquid exits the pressure vessel, causing effervescence which may be undesirable. In such cases, it will be readily understood that the membrane should preferably be substantially impermeable to both the liquid and the gas.

In some embodiments the pressurised fluid source is connected to two or more pressure vessels (e.g. 2, 3, 4, 5, 6, 7, 8, 9 or 10 or more than 10 pressure vessels). In this case one or more of the pressure vessels may be discharging either the gas or a liquid at the same time as one or more other pressure vessels are being pressurised by the device providing pressurised gas, or being charged with the liquid. In this case the device may be connected to a manifold for supplying the pressurised gas to one or more of the pressure vessels. Each of the pressure vessels may then have an inlet valve which for controlling the entry of pressurised gas to the internal space thereof. The valves may in some embodiments be controlled by a controller e.g. a programmable logic controller (PLC).

In an embodiment the device is connected to two pressure vessels. These may be for example located in a river, a lake or some other water source. In operation, the first gas valve leading to a first pressure vessel is closed, and a water inlet valve is opened, thereby allowing the first pressure vessel to fill with water. The water inlet valve is then closed and the first gas valve is opened, allowing the headspace above the water in the first pressure vessel to pressurise with the gas. The first gas valve is then closed and a liquid exit valve is opened allowing the water to be pumped under pressure out of the first pressure vessel, for example for irrigation of adjoining land. As the water from the first pressure vessel is discharging, a water inlet valve is opened in the second pressure vessel, allowing the second pressure vessel to fill with water. When sufficient water has been charged into the second pressure vessel, the water inlet valve to the second pressure vessel is closed and the second gas valve (leading to the second pressure vessel) is opened, allowing the headspace above the water in the second pressure vessel to pressurise with the gas. By the time the first pressure vessel has been substantially discharged of water, the second pressure vessel is charged and pressurised and ready to be discharged. Opening the liquid exit valve of the second pressure vessel allows water from the second pressure vessel to discharge. The process may be repeated, so that when the second pressure vessel is substantially discharged of water, the first pressure vessel is again pressurised and charged with water and ready for discharge.

In the above embodiments which provide pressurised water, the pressurised water may be passed through a purification process under pressure in order to purify it for use, e.g. for drinking. The purification process may comprise known purification elements such as reverse osmosis, activated carbon adsorption, filtration, microfiltration, ultrafiltration or a combination of any two or more of these.

In another application of the device of the invention, the pressure vessel may be cooled. It may for example be located underground, and be cooled naturally by the surrounding soil, rock etc. It may be cooled by means of a heat exchanger. It may be cooled by means of evaporation of water applied to an outside surface thereof. As the gas (e.g. air) is compressed by the device of the invention, it will naturally heat. If the hot compressed gas is cooled, as described above, and then allowed to expand, it may further cool, providing a source of cooling. The gas may be allowed to expand into an expansion chamber or into the open atmosphere. The cooling may be used for example for air-conditioning, refrigeration or some other suitable purpose. Suitably therefore the pressure vessel may take the form of an underground tank. It may be made of a suitable material capable of withstanding the pressure in the pressure vessel, e.g. concrete, metal (steel, stainless steel etc.) or a polymer.

It will be seen from the foregoing that the present invention may be used as a means for storing wind energy (or some other form of energy). Thus the energy provided by the wind may be stored in the form of compressed gas in a pressure vessel and may be then used as required at a later time. It will be appreciated that the greater the volume of the pressure vessel, and the higher the pressure attainable within the pressure vessel, the greater the amount of energy that may be stored using the present invention.

Various embodiments of the present invention may comprise one or more of the following features:
 a) A windmill system in which the bearings and/or drive systems comprise non-lubricating ceramics;
 b) A novel pump system with automatic pressure control.
 c) The ability to pump air, oil, water or other fluids at pressure.
 d) A sealing system in a windmill to accommodate the rotation of the mill head.
 e) A dewatering device for use when compressing and pumping air.
 f) Air delivery and storage at pressure.
 g) Conversion of motors to run on high pressure air at ambient temperature.
 h) Conversion of motors to run on heated high pressure air, and an associated cooling system.
 i) Dual water tank storage and pressure pumping systems.
 j) Water purification system with system regeneration.
 k) Electric power generation by water flow between dual tank systems.
 l) Direct pumping of water by air pressure.

The present invention provides a windmill for collecting wind energy, as shown in FIGS. 11 to 14. A vane assembly is disposed circumferentially around a rotatable shaft and is coupled to said shaft such that rotation of the vane assembly causes rotation of the shaft. The windmill is designed such that in use the wind direction lies in the plane of the vane assembly. This contrasts with conventional windmills, in which the blades face the wind. The conventional case puts greater strain on component parts than the present windmill. In a preferred case, the plane of the vane assembly is horizontal, i.e. the blades face upwards. However other orientations are also possible. For example the vane assembly may be oriented vertically, facing at about 90° to the wind. Any orientation between these extremes is also possible. Thus the angle of the plane of the vane assembly to the horizontal may be about 0 to about 90°, or about 0 to 45, 45 to 90 or 30 to 60°, e.g. about 0, 10, 20, 30, 40, 45, 50, 60, 70, 80 or 90°. As described, the windmill may have two vane assemblies, or may have more than two vane assemblies, e.g. 3, 4, 5, 6, 7, 8, 9 or 10 vane assemblies. In this case, each may independently adopt the above orientations, provided that each vane assembly lies in a plane which is parallel to the wind direction in use. In preferred embodiments, when more than one vane assembly is present, these are all parallel, however this need not necessarily be the case if suitable couplings between the assemblies are used. In cases where the vane assemblies are all parallel to each other, they may be arranged in pairs, each pair having an upper and a lower vane assembly configured to rotate in opposite directions. In some embodiments, one vane assembly of each pair (commonly although not necessarily the lower of the two) is rigidly coupled to the shaft so as to transfer its energy directly to the shaft and the other assembly of the pair is coupled by means of a coupling (e.g. rollers, cogwheels etc.) to the rigidly attached vane assembly so as to transfer its energy to the shaft via the rigidly attached vane assembly. In these embodiments, each of the rigidly attached vane assemblies may configured to rotate in the same direction, and each of the indirectly coupled assemblies may be configured to rotate in the opposite direction to the rigidly attached vane assemblies. In other embodiments, only one of the vane assemblies is attached rigidly to the shaft so as to transfer its energy directly to the shaft and the remaining vane assemblies are coupled indirectly (through one or more couplings) to the same rigidly attached shaft so as to transfer their energy to the shaft via the rigidly attached vane assembly.

The vane assembly of the windmill (or each assembly independently) comprises at least one vane, although commonly a vane assembly will comprise more than one vane so as to improve the efficiency of wind energy collection. It (each) may comprise 1 to about 8 vanes, or 1 to 6, 1 to 4, 2 to 8, 4 to 8 or 3 to 6 vanes, e.g. 1, 2, 3, 4, 5, 6, 7 or 8 vanes. With more than 8 vanes, the additional benefit of further vanes decreases. The vanes are commonly distributed symmetrically about the axis of rotation (commonly although not necessarily about the central shaft). Thus if an assembly has 3 vanes, these may be disposed at 120° angles to each other, if an assembly has 5 vanes, these may be disposed so that the angle between any two adjacent vanes is 72°, and so on. In the event that the windmill has two or more vane assemblies, these may have the same number of vanes or different numbers of vanes. The vanes commonly have an elongated shape, for example a rectangular or approximately rectangular shape, or an elliptical or approximately elliptical shape, although other shapes may be used. Each vane has an axis which extends outwardly from the shaft about which it can rotate. This axis may be the geometric axis of the vane, although this may in some embodiments not be the case. The axis may extend orthogonally from the shaft, or from the axis of rotation of the vane assembly of which they are part. Thus if the shaft is vertical, the axis of the vanes may be horizontal. In some cases this is not the case, and the vanes may not be orthogonal to the axis of rotation of the vane assembly. They may be at an angle of about 0 to about 75° to the axis of rotation, or about 0 to 60, 0 to 45, 0 to 30, 30 to 75, 30 to 60, 30 to 45, 45 to 75 or 45 to 60°, e.g. about 0, 15, 30, 45, 60 or 75° to the axis of rotation. This may provide a "fir tree" effect of the blades about the shaft. In the event that two vane assemblies are present, these may be configured so that the axis of any vane of a first of the two assemblies may be brought parallel to the axis of any vane of the second of the two assemblies by rotation of one or other or both of the assemblies.

The windmill comprises rotation mechanism such that when a vane of the vane assembly rotates through a first position said vane rotates about its axis so that the vane is in a substantially vertical plane and when said vane rotates through a second position it rotates about its axis by about 90°. The first and second positions may be located approximately 180° apart around the shaft. In use, the first position will face directly into the wind and the second position will face directly away from the wind. In this way, when the vane assembly rotates, vanes heading into the wind will be oriented such that their transverse axes are substantially horizontal so as to minimise wind resistance, and vanes heading away from the wind will be oriented substantially vertically so as to maximise the area of the vane exposed to the wind and hence maximise the collection of wind energy by those vanes. In this context, the term "vertical" does not refer to the axis of the vane (which remains at a constant angle relative to the horizontal during operation of the windmill), but rather refers to a plane in which the vane is located. Correspondingly "horizontal" refers to an orientation in which the transverse axis of the vane (i.e. the axis orthogonal to the axis of the vane) is located orthogonally to a vertical plane.

The shaft may be fixed to the vane assembly such that the two co-rotate. It may be integral with the vane assembly (or with at least one of the vane assemblies, if more than one is present). Alternatively it may be coupled by some other means, for example by a gear system. This may be beneficial in locations with very low or very high wind speeds. Gearing may be beneficial in low wind speed regions in order to improve efficiency, and in high wind speed regions in order to reduce stresses on the windmill. The gearing may be variable gearing in order to accommodate different wind speeds. There may be a wind speed detector (anemometer) coupled to the variable gearing so that the gearing may be adjusted according to the prevailing wind speed.

The rotation mechanism may be coupled to a region of each vane at or near a proximal end of said vane. It may comprise a cam. The cam may comprise a sleeve structure surrounding the shaft with elevated and depressed regions which communicate with a portion of the vane, commonly a proximal end of the vane or a shaft extending therefrom, so as to rotate the vane about its axis as the vane assembly rotates. Each vane may be configured so that it can rest stably in either a horizontal or vertical orientation but not at an intermediate angle. In this case the rotation mechanism may be a barrier (or several barriers, located at or related to the first and second positions) which causes the vane to rotate (flip) about its axis as and when it encounters the barrier, which is as it passes either the first or second position.

In use, the vane assembly may rotate in a plane substantially parallel to the wind direction, commonly in a substantially horizontal plane parallel to the wind direction. This may be achieved by use of a direction unit. The direction unit is capable of detecting the wind direction and of rotating at least a portion of the windmill in the appropriate direction. When the windmill has been rotated, each vane travelling in a leeward direction (i.e. in the direction of the wind) is located in a substantially vertical plane so as to maximise the thrust provided by the wind, and when travelling in a windward direction (i.e. into the wind) lies in a plane substantially orthogonal to the substantially vertical plane so as to minimise wind resistance, and hence minimise retardation due to the returning vane. The direction unit may comprise a wind vane, as is commonly used on conventional windmills to rotate the head of the windmill so as to face into the wind. Alternatively it may comprise a wind direction detector coupled to a motor, which is in turn coupled to the windmill. In this case the detector can detect the wind direction and send a signal relating to that direction to the motor so as to rotate a portion of the windmill as required. In this case the detector may also detect wind strength or wind speed, so as to control a gearing mechanism between the vane assembly and the shaft. The critical portion of the windmill that requires rotating in the case of a horizontal vane assembly arrangement is the rotation mechanism, so as to ensure that the vanes rotate about their axes at the right point of rotation (i.e. that the first and second positions are correctly located). In the event that the vane assembly rotates in a vertical plane, it may be necessary to rotate the vane assembly itself so as to ensure that the plane of rotation is parallel to the wind direction.

As described earlier, the windmill may comprise a second vane assembly coupled to the first vane assembly, similar to the first assembly. The rotation mechanism is such that when a vane of the second vane assembly rotates through a third position said vane rotates about its axis so that the vane is in a substantially vertical plane and when said vane rotates through a fourth position it rotates about its axis by about 90°, wherein the third and fourth positions are located approximately 180° apart around the shaft. In cases where the first and second vane assemblies are parallel to each other, they may counterrotate relative to each other. In these cases also, the third position of the second vane assembly may be correlated with (e.g. directly above or below) the first position of the first assembly, and the fourth position of the second vane assembly may be correlated with (e.g. directly above or below) the second position of the first assembly. Thus in use, when a vane of the first assembly or of the second assembly passes the leewardmost point of its rotation it will rotate away from the vertical position and when it passes the windwardmost point of its rotation it will rotate into the vertical position.

As discussed above, the second vane assembly may be located substantially parallel to the first vane assembly, commonly coaxially therewith so that the axis of rotation of the first and second vane assemblies coincide. However other relative orientations may also be used in some cases. Thus for example the first vane assembly may be horizontal and the second vane assembly vertical, the rotation of the second assembly being coupled to that of the first assembly by a suitable arrangement of rotating shafts and gearwheels. Other possible arrangements include a pair of parallel horizontal first and second vane assemblies coupled to a second, parallel but vertical, pair of third and fourth vane assemblies. Other suitable arrangements will be readily apparent.

The second vane assembly may be coupled to the first vane assembly by means of a coupling. This may comprise one or more rollers and/or one or more cogwheels. In order to efficiently transfer energy, the coupling should have minimal slippage. Thus the rollers may be high friction rollers. They may be cogwheels which prevent slippage by means of interlocking gear teeth.

The windmill described above may have an efficiency well above that of conventional windmills. Conventional windmills have an efficiency of typically about 9%. The windmill of the present invention may be at least about 50% efficient, or at least about 60, 70, 72, 75 or 80% efficient. It has the advantage that it is capable of running on wind speeds lower than would be possible for conventional windmills. This is in part due to the fact that each blade, when harvesting wind energy, is directly facing the wind, whereas in conventional windmills only a portion of any blade faces the wind. It may for example be capable of operating on a wind speed as low as about 0.2 m/s, or 0.25, 0.3, 0.35, 0.4, 0.45 or 0.5 m/s. It may utilise non-lubricant ceramics for efficient running, for example in rollers that transfer energy between the vane assemblies.

The shaft of the windmill may be coupled to a generator for generating electricity or to some other means for utilising, harvesting or converting the energy collected by the windmill from the wind. The earlier portion of this specification discussed various means for doing so, and these are summarised below.

The device of the first aspect discussed above is intended to compress air using energy from a variable or intermittent source. The wind is a typically variable source and thus the windmill described above is well suited for use with such a device. The shaft of the windmill may be coupled to the rotor of the device so as to transfer energy into the device so as to provide compressed gas, commonly compressed air. The coupling may be a geared coupling or it may be a direct coupling. Thus the shaft and the rotor may represent different portions of a single elongated component, i.e. the rotor may be an extension of the shaft, so that rotation of the shaft represents rotation of the rotor.

As also described above, the gas compressor provided by the combination of the device of the first aspect with the windmill may be used to compress gas in a pressure vessel. This represents a means to store energy from the wind in the form of compressed gas, which may be used at will in a controlled manner. The combination may be capable of generating a body of compressed gas having a pressure of over about 100 psi, or over about 150, 200 or 250 psi, or of about 100 to 400, 100 to 300, 200 to 300, 300 to 400 or 250 to 350 psi, e.g. about 100, 150, 200, 250, 300, 350 or 400 psi. This represents a considerable storage of energy.

For example the pressure vessel may be coupled with an engine which is capable of running on a compressed gas. Internal combustion engines operate by means of expansion of a gas due to explosive combustion in one or more cylinders of the engine. These, for example diesel generators, may be converted to run directly on compressed gas by expanding the gas in the cylinders.

In another example the pressure vessel may be coupled to a water supply system. Thus the wind energy is used to compress air in the pressure vessel, which applies pressure to the water. This may be released at will, and the pressure may be used in a purification process e.g. filtration or reverse osmosis or activated carbon purification.

In a further example, the compressed gas may be used as a coolant. As the gas is compressed (as described above) it will naturally heat. If this heat energy is removed, e.g. by a heat exchanger, or simply by natural radiative cooling from a radiative vessel, the compressed gas may be returned to at or near ambient temperature. Allowing this gas to expand (by releasing the pressure) provides cooled gas which may be used for refrigeration, air conditioning etc. This application potentially represents an inexpensive source of air conditioning and refrigeration which is free of greenhouse gas production.

BRIEF DESCRIPTION OF THE DRAWINGS

Preferred embodiments of the present invention will now be described, by way of an example only, with reference to the accompanying drawings wherein:

FIG. 3B shows slots in the air inlet of the block in the device and a diagram of air flow through the outlet;

DETAILED DESCRIPTION OF PREFERRED EMBODIMENTS

Figure 3:
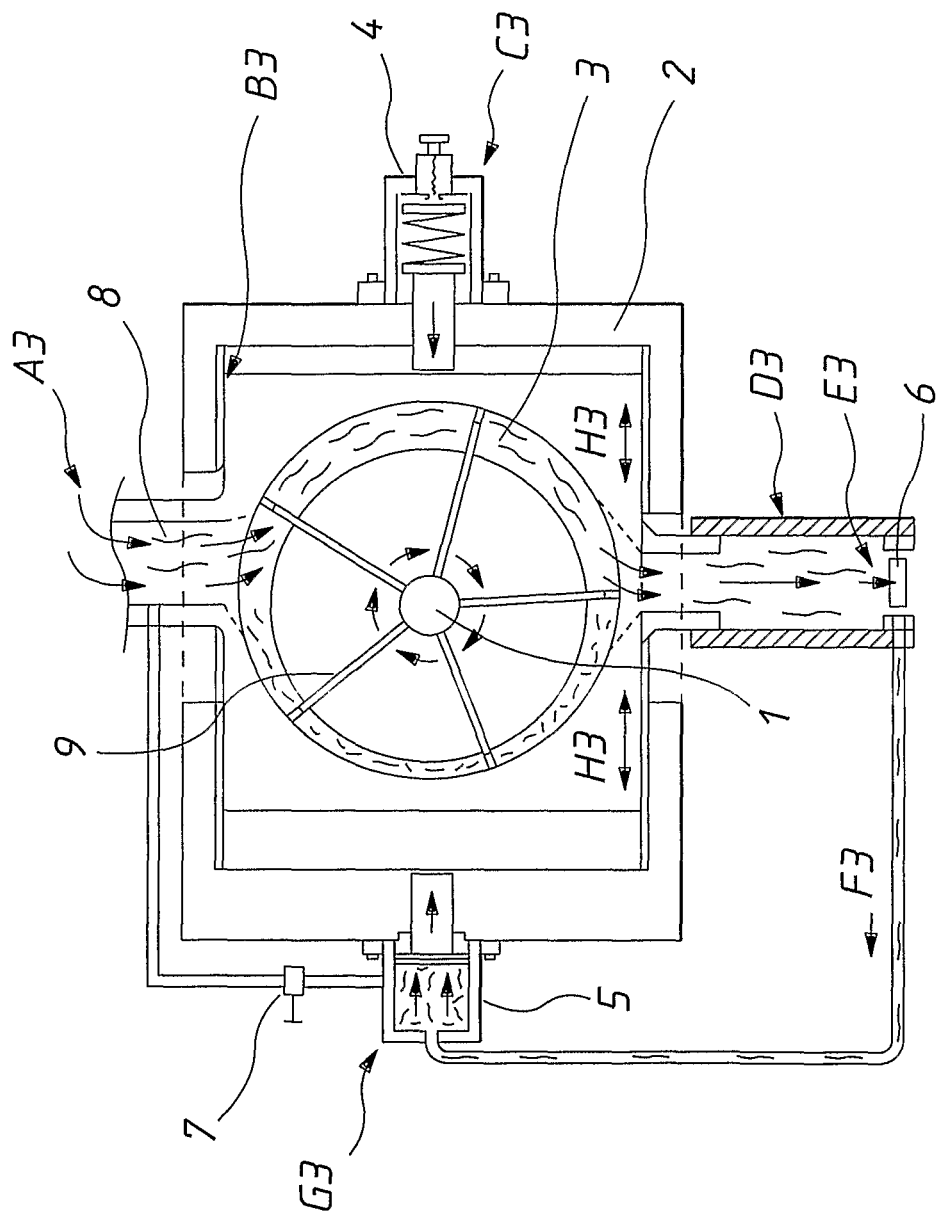

FIG. 3 shows a further diagram of the device of the present invention. Elements and features of the device of FIG. 3 include:

1. Rotor: The device is connected directly to a drive shaft powered by wind blades i.e. rotor 1 is powered directly by wind energy. The ends of the rotor are coated with non-lubricant ceramics. The rotor has slots cut in line with the non-lubricant vanes. This completes the required sealing of the cavity against air leakage while minimising friction damage.
2. Housing: This houses a specially designed block with a stainless steel tube forming the inner surface thereof. The block is positioned in the sealed housing, and is capable of moving therein so as to adjust the volume of gas flow through the device. The inner surface of the stainless steel tube of the block forms the cavity in which the rotor rotates. It has slotted inlets and outlets described below, to allow air to enter and exit the cavity. The tube has a ground internal surface to accommodate the non-lubricant vanes. At each end of the stainless steel tube the surface is supplied with non-lubricant ceramics so as to prevent or at least minimise air leakages. The housing itself holds the block in place and creates a pivot point for the moving block with non-lubricant bearings. The housing supports the two pressure control units which control the movement of the block, and hence of the stainless steel tube. The housing has ground internal surfaces at front and rear to seal against the non-lubricant ceramics of the stainless steel tube. A small shaft (not shown) extends from the support frame and is attached to each end of the stainless steel tube, allowing the stainless steel tube to be moved by the pressure control system.
3. Cavity: The pumping volume is created and varied by the movement of the block. The block is moved in relation to the energy available from the wind via the drive shaft.
4. Second position adjustor: A spring loaded adjustment balances the pressure on the block.
5. First position adjustor: The reverse pressure system is provided to move the block according to the wind energy and is driven by the outlet pressure of the device. This is a plunger system for controlling the position of the block.
6. Pressure valve: This provides a pressure control system which is adjustable so as to control the outlet pressure of the device. Thus in use, air passes to a pressure control one way valve which may be set at a fixed pressure.
7. Bleed valve: This is provided to control the variation in position of the block for a particular outlet pressure of the device. By adjustment of the bleed valve, the degree of movement provided by the movement controller for a particular outlet pressure may be controlled. Gas which passes the bleed valve may be returned to the inlet or may be allowed to escape to the atmosphere.
8. Inlet: For admitting gas into the device.

If the device is used for pumping air, a dewatering device may be added to remove moisture, rainwater etc. from the air prior to it entering the device. Slots may be provided in the block and the housing at the inlet and outlet of the device. They are machined so as to allow for inlet and outlet of the pumped gas. They are also designed so that they do not impede the rotation of the rotor by admitting the vanes as the rotor rotates. These are shown in FIGS. 3A and 3B.

9. Vanes: spring loaded vanes made, for example, of non-lubricant ceramic in order to avoid wear, rotate during operation of the device and sweep gas from the inlet to the outlet. These are designed to fit into slots in the rotor and are made of non-lubricant material. They are spring loaded so as to maintain contact with the inner surface of the stainless steel tube.

In FIG. 3 the following indications also apply:
A3—air filter
B3—non-lubricant material
C3—pressure control
D3—high pressure flexible hose
E3—air to pressure control, one way valve: fixed pressure
F3—pressure air for control
G3—pressure positioning
H3—movement of block FIG. 3A shows a top view of the device shown in FIG. 3. In FIG. 3A the slots for the air inlet are clearly visible. These are required to allow ingress of air into the cavity while allowing the spring loaded vanes of the rotor to continue to rotate. FIG. 3A also indicates the location of non-lubricant ceramic surfaces used to provide low friction rotation while still providing an air seal. Thus non-lubricant lining is used in line with the vanes to remove or reduce wear and reduce or eliminate leakage.

Figure 3A:
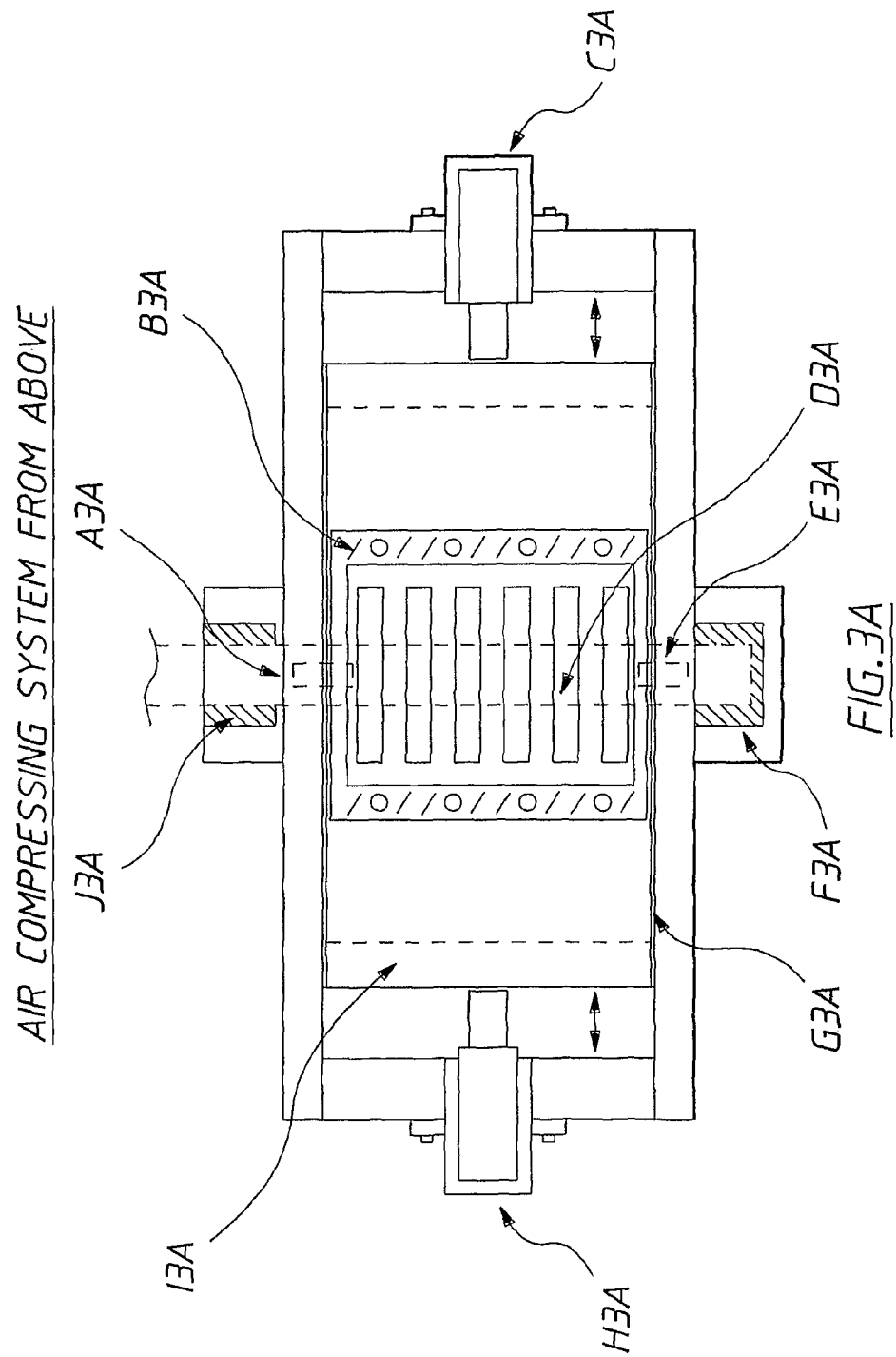
FIG. 3A shows a view of the device from above.

In FIG. 3A the following indications apply:
A3A—pivot point for movement
B3A—inlet or outlet shutes bolted onto tube for air inlet and outlet
C3A—pressure adjustment
D3A—air inlet slots at top, air outlet slots at bottom
E3A—pivot point for pressure movement
F3A—non-lubricant bearing
G3A—non-lubricant lining. In line with vanes to remove wear and to stop leakage
H3A—pressure adjustment
13A—stainless steel tube
J3A—non-lubricant bearing.

FIG. 3B shows further details of the slots located at the inlet and outlet of the cavity as described above in FIG. 3A. In FIG. 3B the following indications apply:
A3B—vanes in unit supported
B3B—air passes
C3B—slots cut in top and bottom of stainless steel inset
D3B—thickness of inset
E3B—diameter of inset
F3B—slots cut at top and bottom of inset to allow air flow, but support vanes The left hand portion of FIG. 3B shows a cut-away of the cavity showing movement of air out of the cavity propelled by the rotating vanes. Thus FIG. 3B illustrates sluts cut at top and bottom of an insert to allow air flow but support the vanes. The slots may be formed in an insert, e.g. a stainless steel insert, as show in the left hand portion. The insert may fit inside the cavity.

Figure 1A:
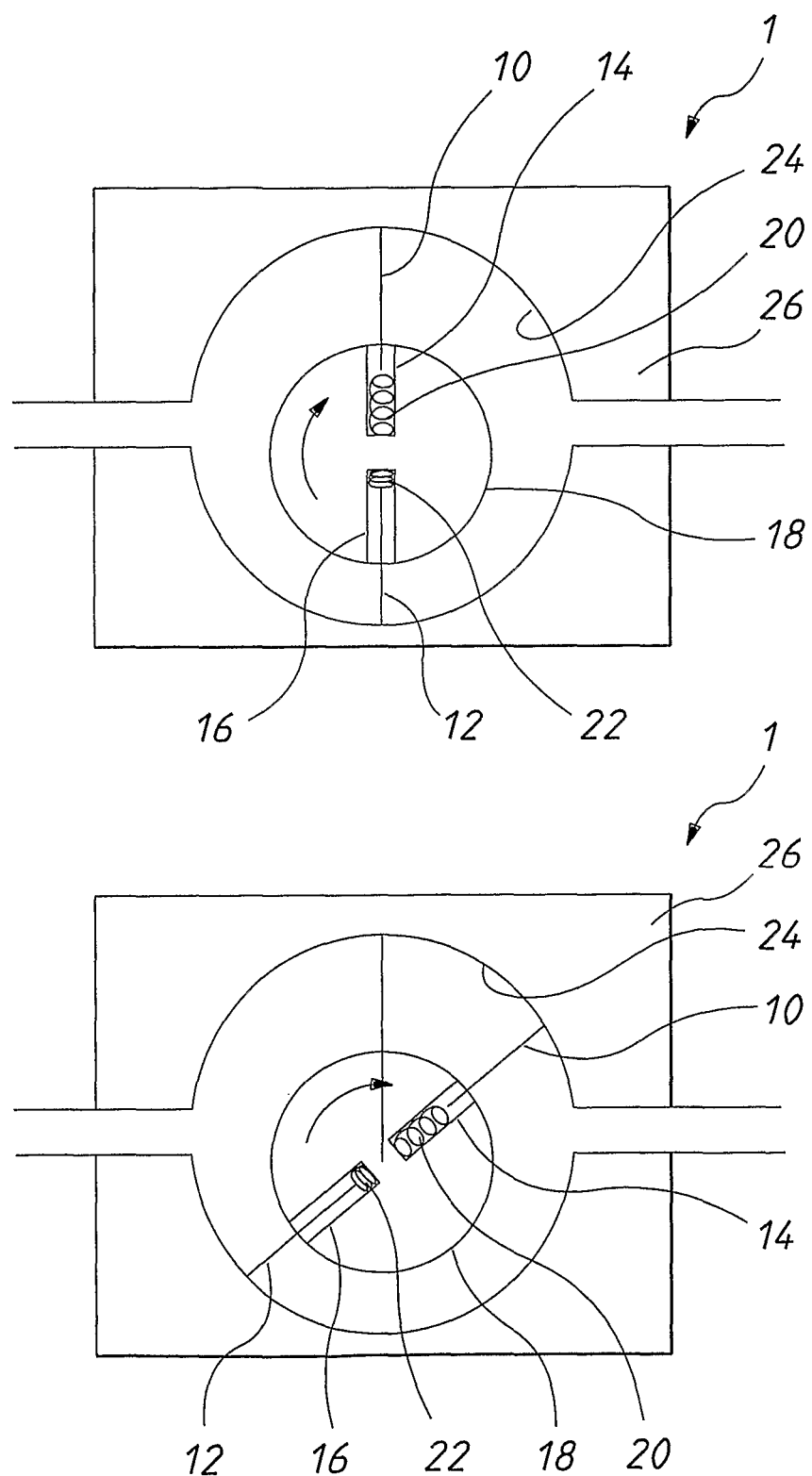
FIGS. 1 to 3 are diagrammatic representations of a device according to the present invention.
Figure 1B:
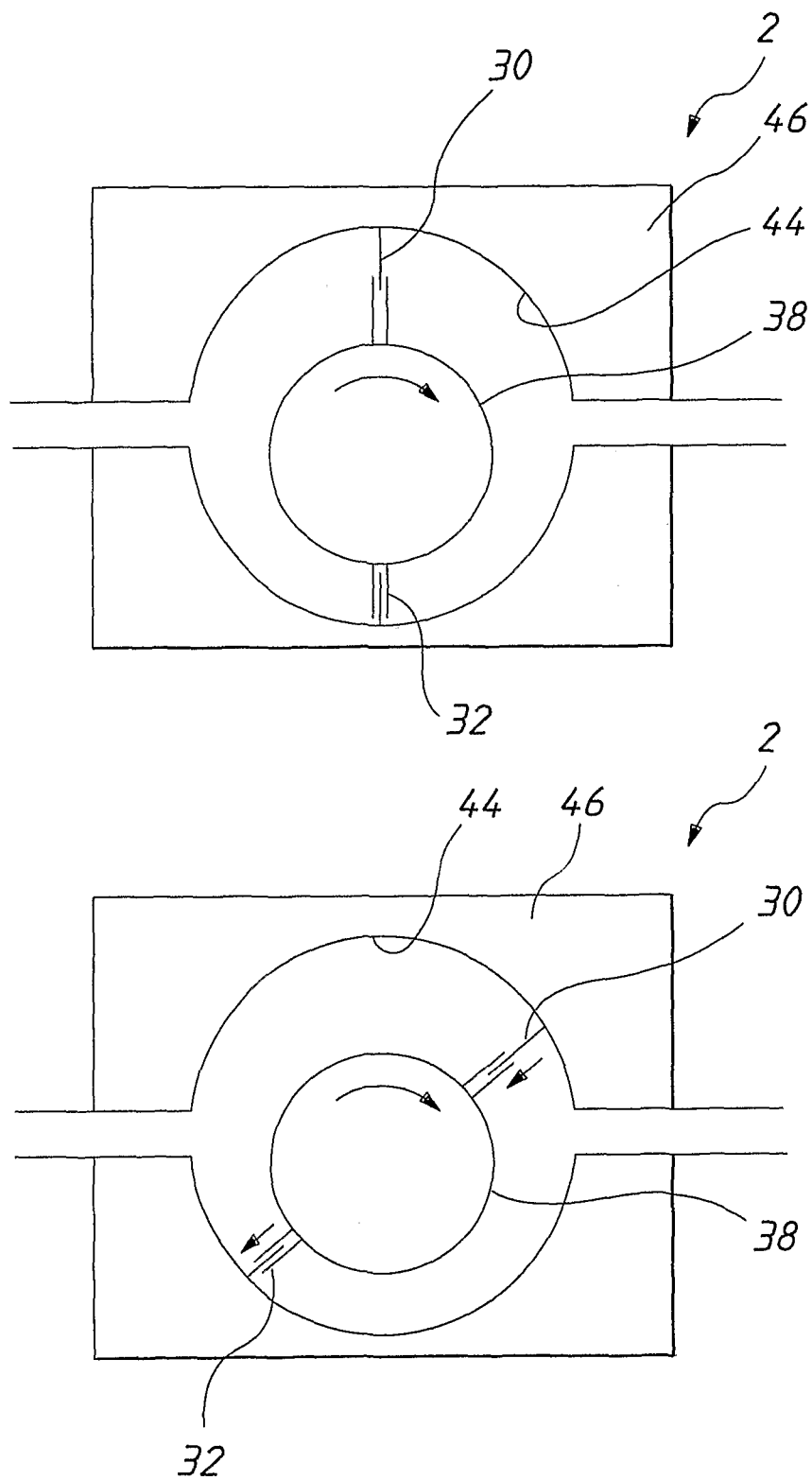
Figure 1C:
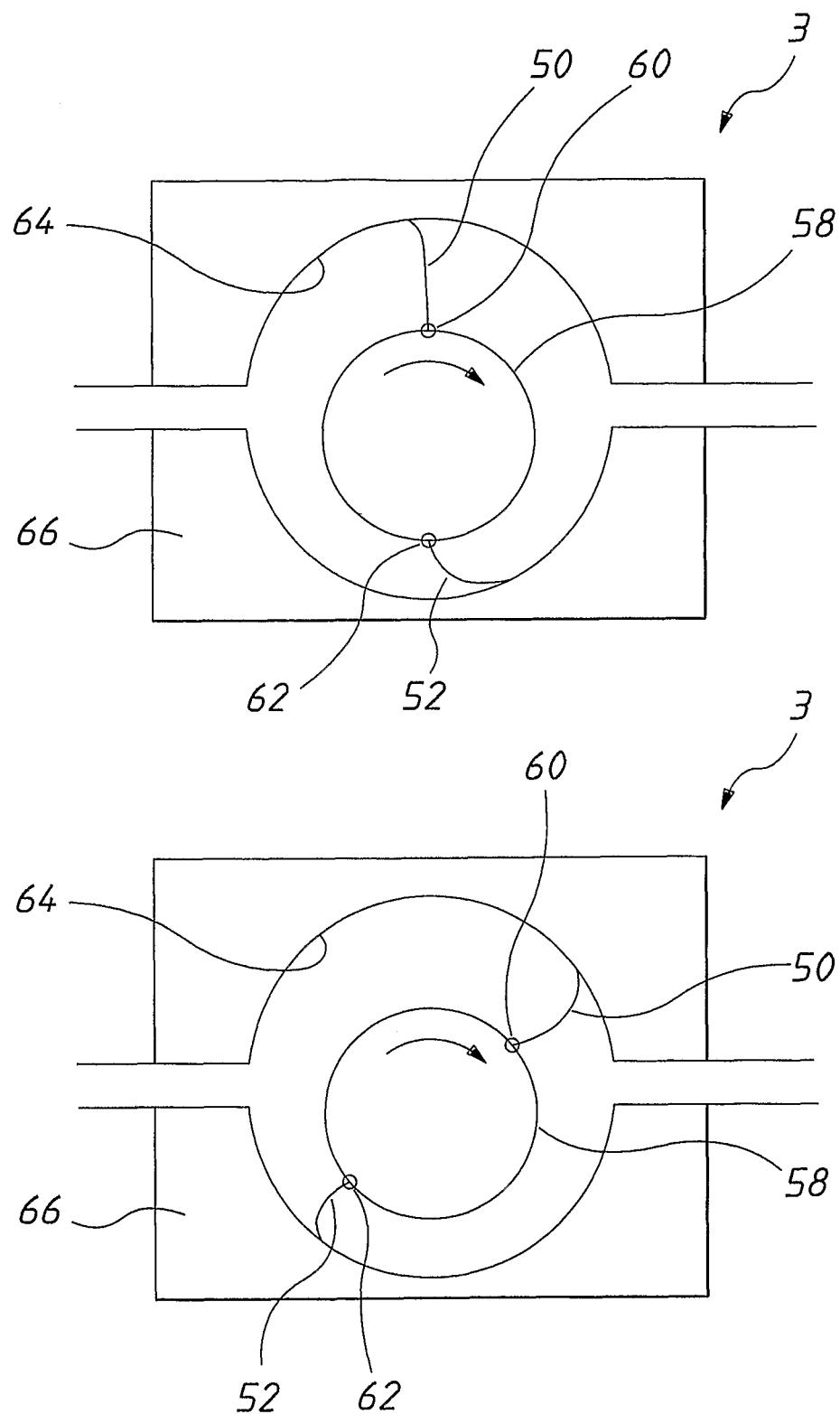
Figure 1D:
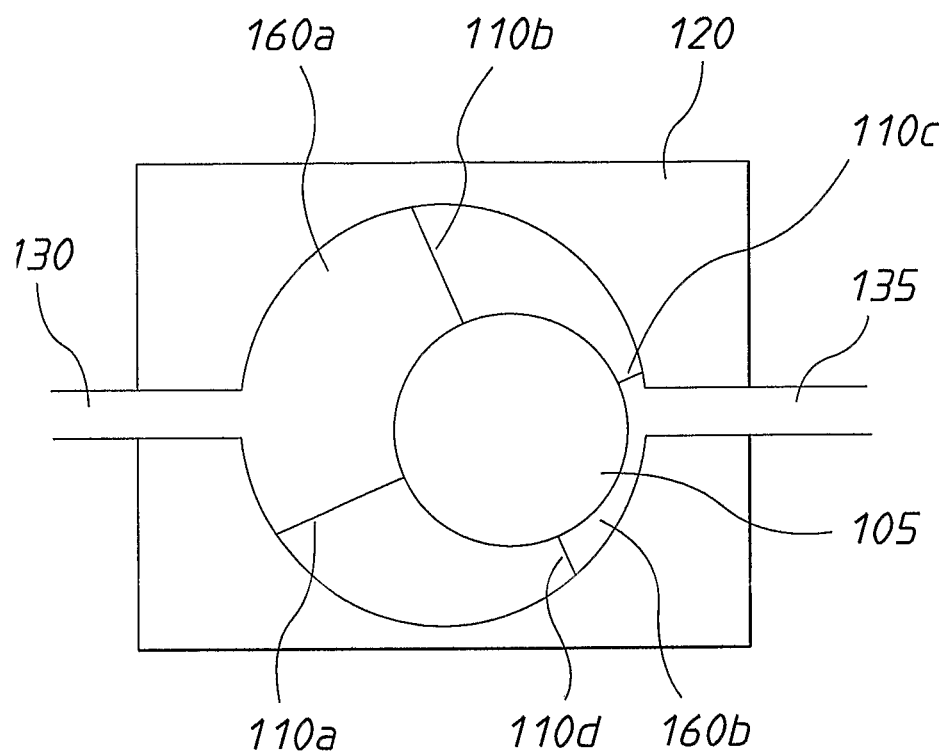
Figure 2:
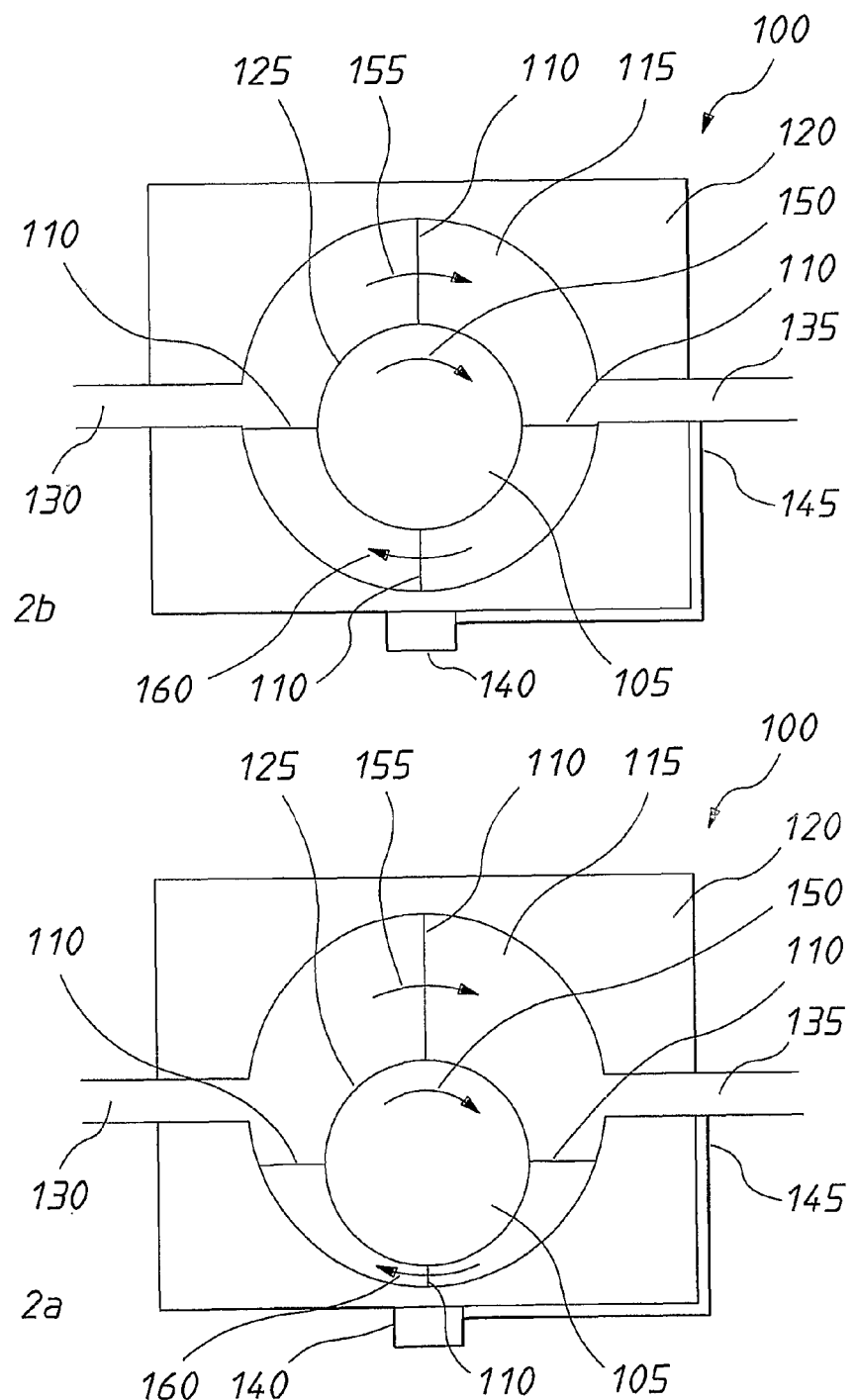
Figure 4:
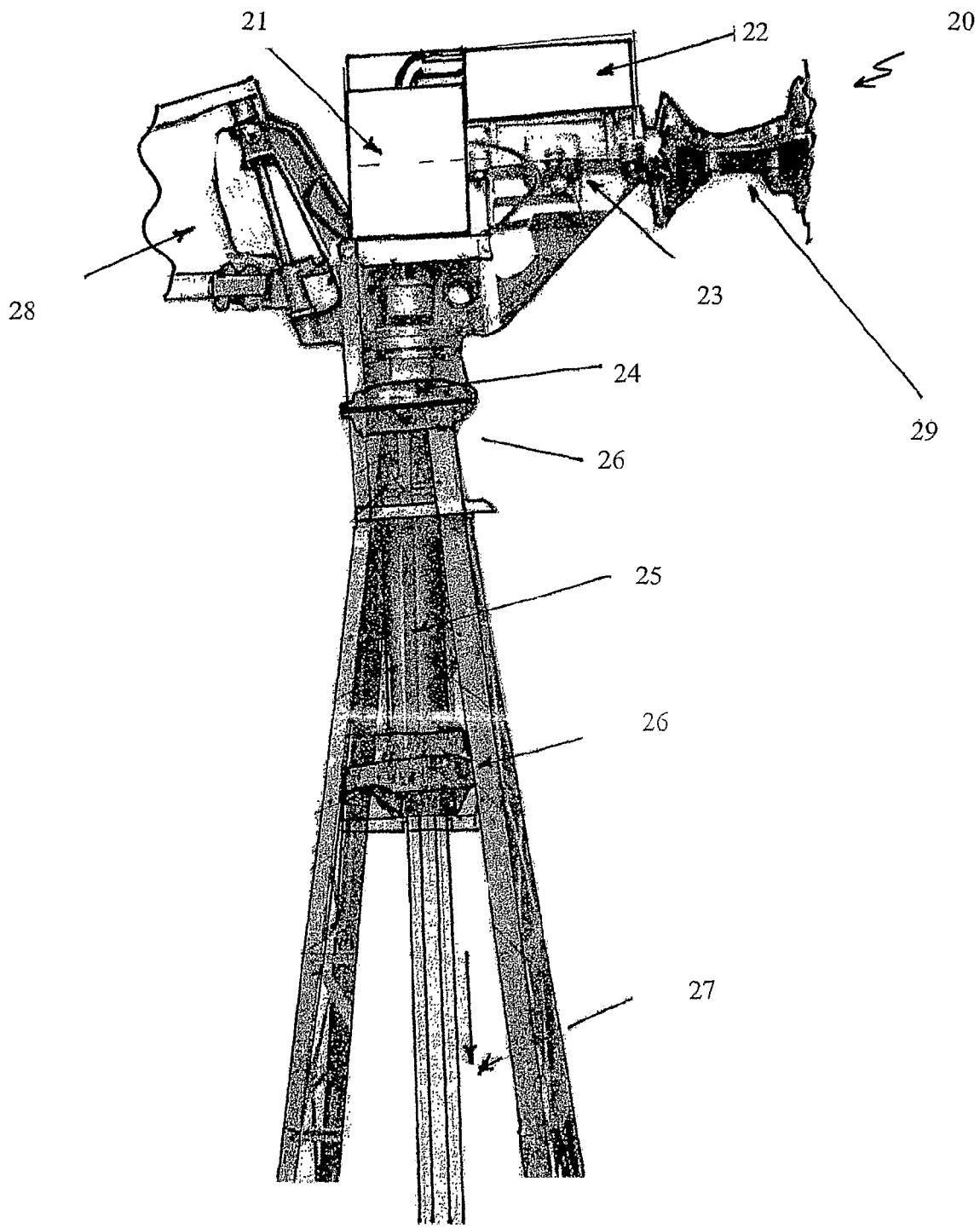
FIG. 4 is a diagram of the head of a windmill incorporating a device according to the invention.

FIG. 4 shows a diagram of the head of a windmill 20 which incorporates a device as described above. The windmill may be used to transfer wind energy to an energy storage element. Elements and features of the windmill of FIG. 4 include:

21. Pump: this has been described earlier, with reference in particular to FIGS. 2 and 3. It may form part of a compression system which is capable of compressing air, water, oil or other fluids by means of compressed air from the pump.
22. Water separation system: A dewatering device is provided for removing water from air prior to it entering the inlet of pump 21.
23. Windmill bearings: Conventional windmill bearings for rotation and thrust on the mill drive shaft may be replaced by non-lubricant bearings such as non-lubricant ceramic bearings or fluorocarbon polymer (e.g. PTFE) coated bearings.
24. Non-lubricant bearings: Conventional bearings in the head of the windmill may be replaced by non-lubricant bearings such as non-lubricant ceramic bearings or fluorocarbon polymer (e.g. PTFE) coated bearings.

25. Sealing system: A sealing system is provided to allow transfer of the pressurised air from the pump in the windmill and allow for rotation of the upper portion of the windmill.
26. Non-lubricant bearings: The pressure interchange system may use non-lubricant bearings as described above.
27. Air flow tube: This is provided for taking the compressed air from the pump to a location e.g. a pressure vessel or a compressed air driven motor, where it may be stored or used.
28. Mill tail: this may also have non-lubricant bearings as described above.
29. Mill head coupling: The coupling between the blades of the windmill (not shown in FIG. 4) and pump 21 has been strengthened relative to conventional windmills to allow for rotation of the head of windmill 20 at all wind speeds.

Figure 5:
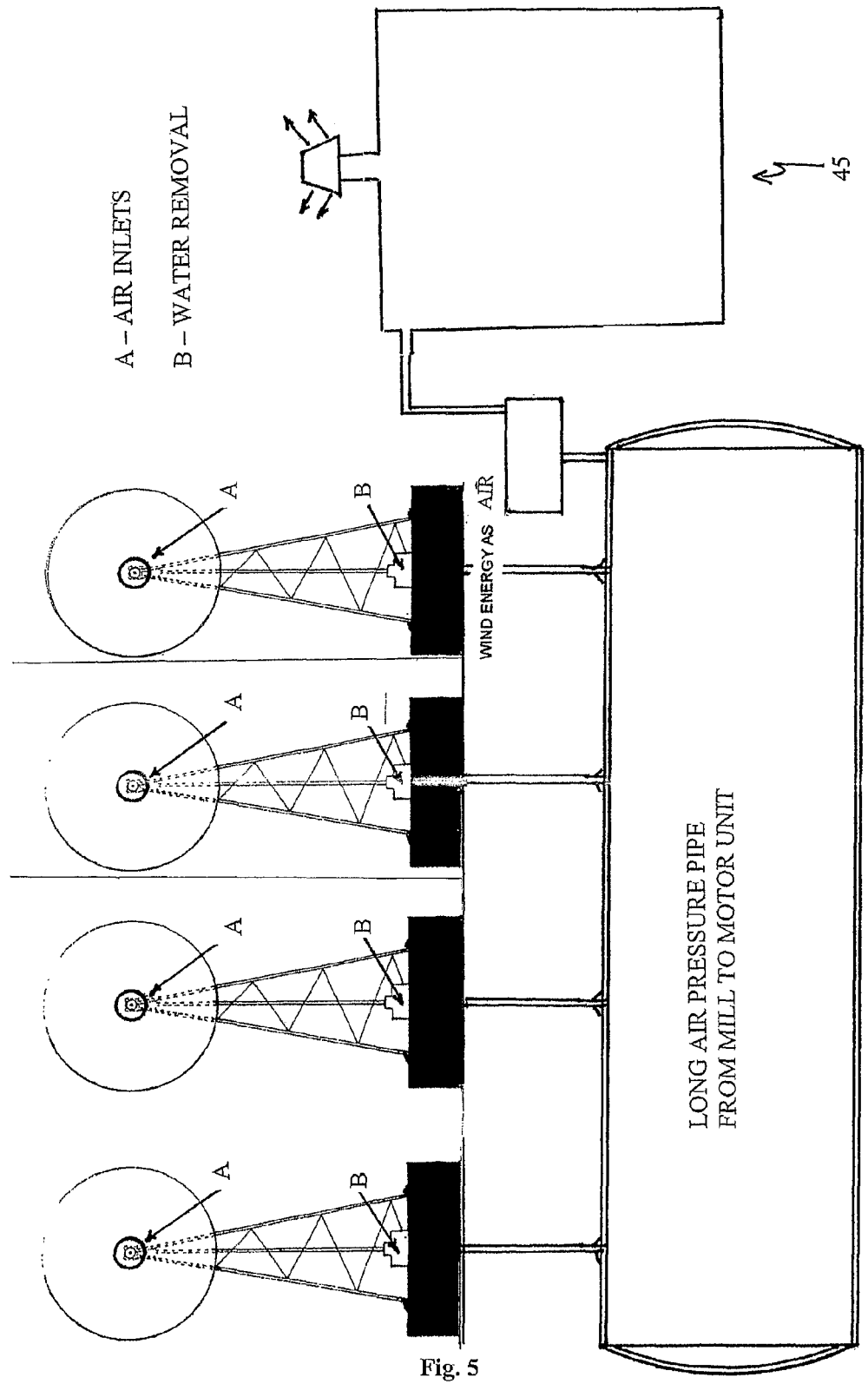
FIG. 5 is a diagram of an engine coupled to a pressurised gas source according to the invention.

FIG. 5 is a diagram of a motor coupled to a pressurised gas source according to the invention. Thus FIG. 5 shows several windmills 40, each of which incorporate a pump as described with reference to FIGS. 2 and 3. FIG. 4 shows the head of the windmills in greater detail and has been described above. Each of the windmills has an air inlet A. Air which is introduced to the pump of windmill 40 is compressed by the pump and passes down pipe 41 to pressure vessel 42. Pressure vessel 42 may be in the form of a long air pressure pipe leading from the windmill(s) to a motor 45. Each pipe 41 is fitted with a dewatering device B for water removal. This is useful in the event that the compressed air passing down pipe 41 contains water, as it is preferred that no water enters pressure vessel 42. Compressed air from windmills 40 is then stored in pressure vessel 42, representing a storage of energy harvested from wind by windmills 40. Pipe 43, fitted with pressure control valve 44, connects pressure vessel 42 to motor 45. Motor 45 is adapted to run using compressed air, such that the expansion of the compressed air in the cylinders drives the pistons of the motor in the same way as expansion due to combustion of fuel in the cylinders does in a conventional internal combustion motor. Alternatively, motor 45 might be a rotary engine, or some other engine that is capable of being powered by compressed air. Air from the motor, e.g. from the cylinders, is able to pass out of motor 45 through air outlet 46. Pressure control valve 44 ensures that the correct pressure of air for motor 44 is delivered from pressure vessel 42.

Figure 6:
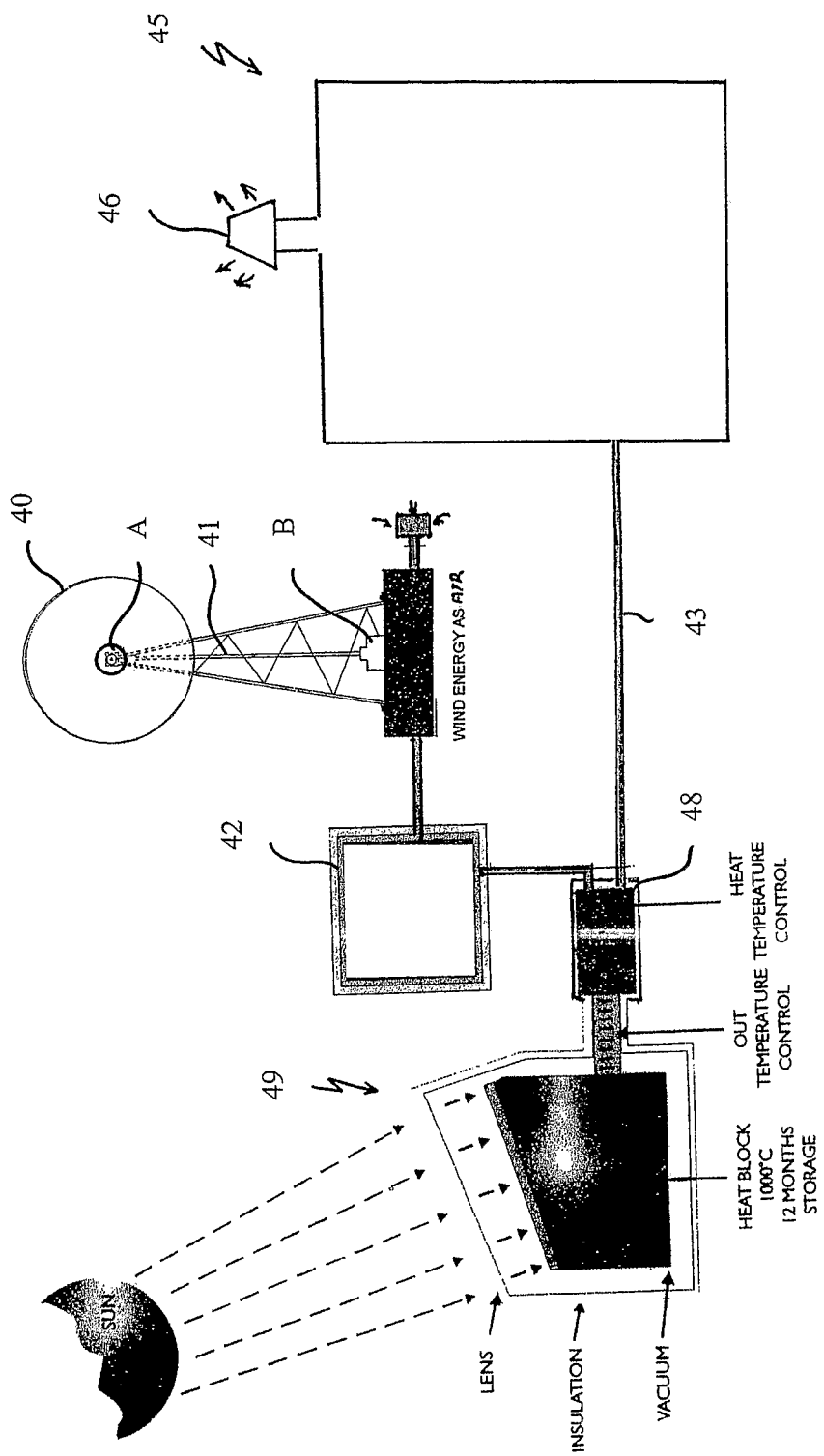
FIG. 6 is a diagram of a system in which a device according to the present invention and a solar energy collector provide energy for running a motor.

FIG. 6 is a diagram of a system similar to that of FIG. 5 in which the wind energy provided by the windmill is supplemented by solar energy for running the motor. In FIG. 6, windmill 40 has air inlet A and is connected to pipe 41 fitted with dewatering device B, as described above in reference to FIG. 5. FIG. 6 shows only a single windmill 40, however it will be understood that several windmills may be used, as discussed above. Pipe 41 conveys compressed air to pressure vessel 42, as described earlier. Compressed air from pressure vessel 42 in FIG. 6 is conveyed to heat exchanger 48, which is coupled to solar heating system 49. This is described in greater detail below with reference to FIGS. 7 and 8. Briefly, in solar heating system 49, solar energy from the sun impinges on a lens or a series of lenses which pass the solar energy to a thermal storage block located in a vacuum chamber which is insulated on the outside. The insulation reduces thermal losses, and the vacuum surrounding the thermal storage block reduces convective and conductive heat losses. A suitable material for use in the storage block is high purity graphite. The storage block may be capable of storing heat energy for up to 12 months, or even longer, enabling the energy to be used when required. Commonly the thermal storage block is maintained at a temperature of about 1000° C. A heat transfer bar is used to transfer heat energy from the thermal storage block to heat exchanger 48. Heat exchanger 48 is used to heat the compressed gas from the pressure vessel, thereby increasing its pressure further. A pressure regulator (not shown) provides heated compressed gas to motor 45 as described above with reference to FIG. 5. Exhaust gas from motor 45 is then exhausted through gas outlet 46.

The systems shown in FIGS. 5 and 6 provide for the running of motor 45 using freely available energy sources with no energy costs and without the generation of environmental pollutants such as carbon dioxide that are commonly generated from fuel powered motors.

Figure 7:
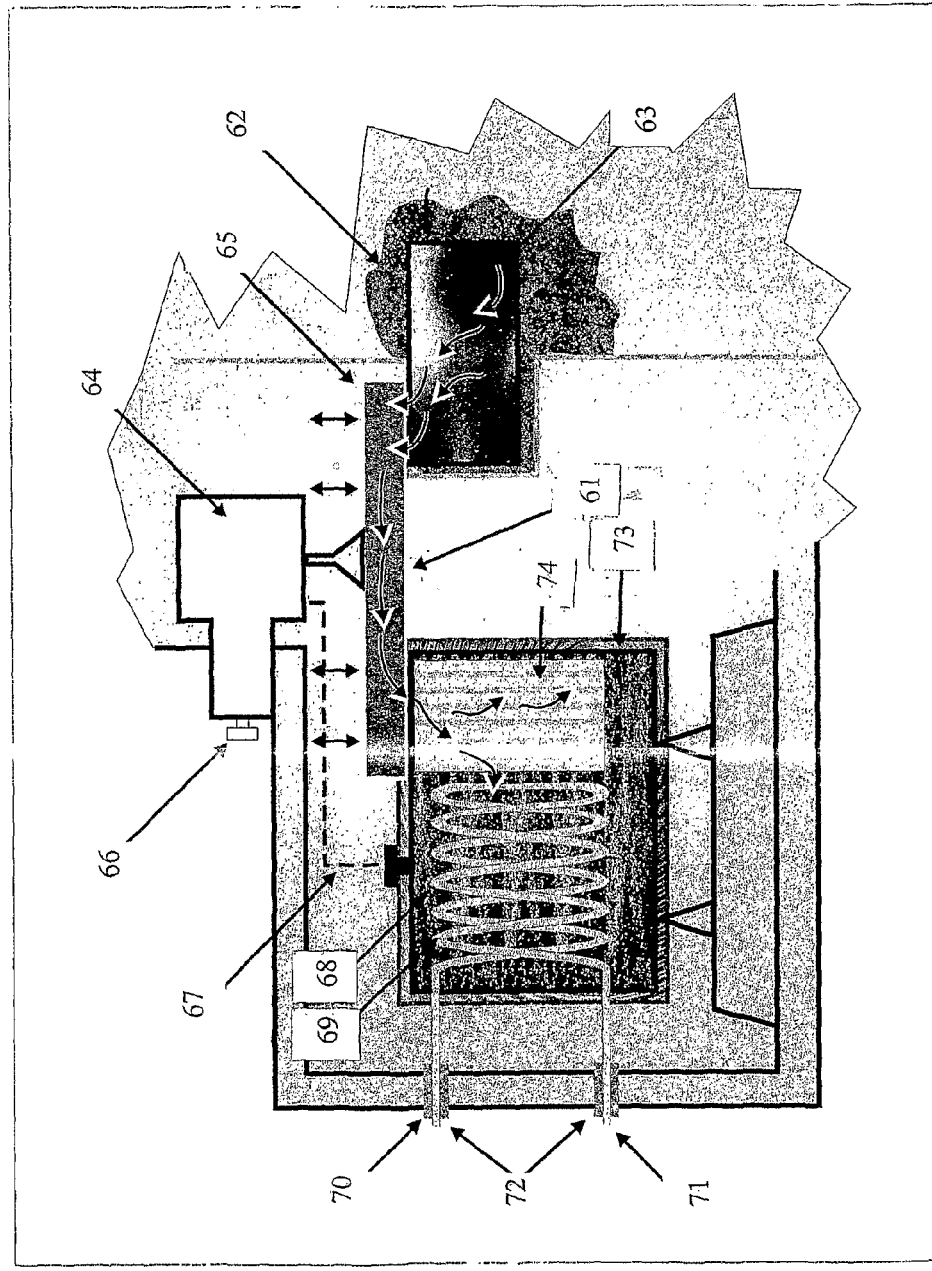
FIG. 7 is a diagram of a heating system which may be used to heat pressurised gas.

FIG. 7 shows a diagram of a heating system which may be used in the system of FIG. 6 to heat pressurised gas from windmill 40. The elements of the heating system are described below:

Heat transfer bridge (61): This is made of a material with high thermal conductivity. A suitable material is a combination of copper and anthracite, which has high heat transfer capability.

Heat storage block (62): This is filled with a high heat capacity material such as anthracite, preferably high purity (e.g. >99% w/w, or >99.5 or >99.9%). This is mounted in a vacuum (pressure less than about 1 mbar, or less than about 0.5 or 0.1 mbar). Being black, anthracite has favourable heat radiation properties.

Collection block (63): This is made of a material with high thermal conductivity, e.g. a combination of copper and anthracite. The collection block is designed to collect heat from heat storage block 62 and transfer it to heat transfer bridge 61. Thus a portion of the top surface of collection block 63 is capable of contacting heat transfer bridge 61.

Temperature control system (64): This controls the transfer of thermal energy from collection block 63 to transfer block 74, i.e. from heat storage block 62 to slave block 68 (see below), by raising and lowering heat transfer bridge 61 so as to break or form the thermal contact between collection block 63 and transfer block 74.

Thermal insulation (65): The non-contact surfaces of heat transfer bridge 61 are heavily insulated to ensure minimal thermal losses.

Temperature adjustment system (66): This controls the operation of temperature control system 64 so as to control the temperature of slave block 68.

Thermal feedback system (67): This comprises a thermal measuring device, e.g. a thermocouple, for measuring the temperature of slave block 68. It also comprises a signal coupling for sending a temperature related signal to temperature control system 64.

Slave block (68): This is thermally coupled to transfer block 74 for receiving heat energy from heat storage block 62. It is thermally coupled to heat exchange piping system 69, so as to heat a heat transfer fluid in that system. It is commonly located in a vacuum chamber having a metal casing, preferably an insulated metal casing. The slave block comprises a high heat capacity substance for example high purity anthracite as described above.

Heat exchange piping system (69): This allows for heat transfer from slave block 68 to a heat transfer fluid in the system. Commonly the piping of system 69 is embedded in slave block 68. It is designed to avoid expansion differential problems.

Heat transfer fluid inlet (70): This allows for the entry of a heat transfer fluid (gas or liquid) into the heat exchange piping system. The heated fluid may be used as described in FIG. 6 for heating a compressed gas for energy transfer and/or storage, or it may be used directly for space heating or for an air conditioning cooling system.

Heat transfer fluid outlet (71): The heated heat transfer fluid exits heat exchange piping system 69 through exit 71.

Insulation (72): The vacuum surrounding slave block 68 is housed in an insulated housing. Penetrations are provided for inlet 70 and outlet 71 so as to allow heat transfer fluid to enter and exit the heat exchange piping system 69.

Inner insulation (73): Slave block 68 may have additional insulation inside the vacuum chamber for further reducing unwanted energy losses from the slave block.

Transfer block (74): This is designed to accept heat from bridge 65 and transfer it to slave block 68. It is commonly made from a high thermal conductivity material, for example copper, silver or carbon (e.g. anthracite) in combination with one or both of these. It may be at least partially embedded in slave block 68 to facilitate heat transfer.

In operation of the heating system shown in FIG. 7, heat from heat storage block 62 is transferred to collection block 63, which is commonly partially embedded in block 62. Heat flows through collection block 63 to transfer block 74 by means of heat transfer bridge 61. Transfer block 74 transfers the heat energy to slave block 68. When slave block 68 exceeds a predetermined temperature (which is preset by means of temperature adjustment system 66), the thermal measuring device of thermal feedback system 67 signals temperature control system 64, causing temperature control system 64 to raise heat transfer bridge so as to break the thermal connection between collection block 63 and transfer block 74. Once the temperature of slave block 68 drops below the predetermined temperature, the thermal measuring device of thermal feedback system 67 signals temperature control system 64, causing temperature control system 64 to lower heat transfer bridge so as to reform the thermal connection between collection block 63 and transfer block 74. In this fashion, slave block 68 is maintained within a narrow range around the predetermined temperature. Heat transfer fluid enters heat exchange piping system 69 by means of inlet 70, and is heated as it passes through slave block 68, exiting through outlet 71.

Figure 8:
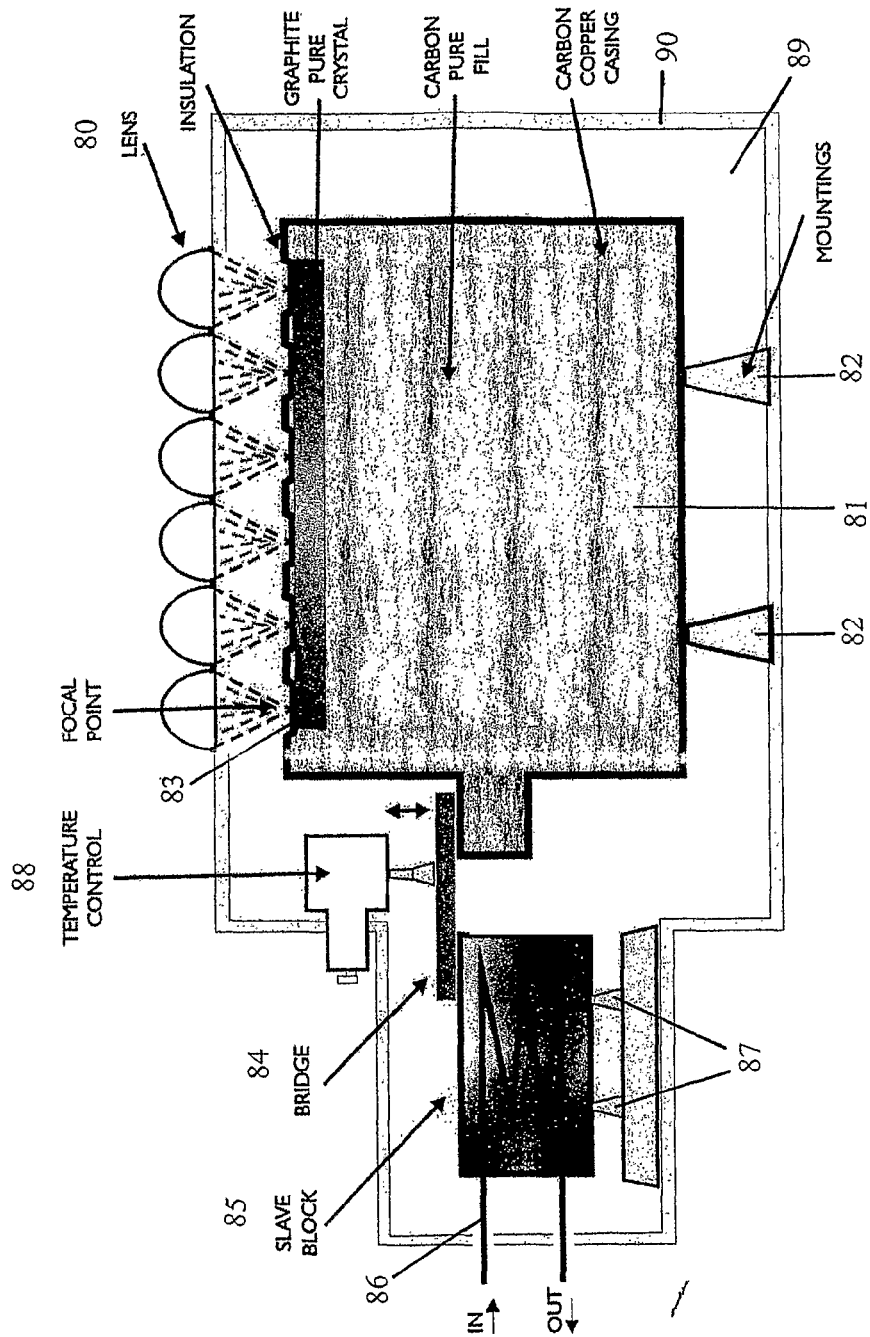
FIG. 8 is a diagram of a solar energy collection and storage system which may be used to heat pressurised gas.

FIG. 8 is a diagram of a solar energy collection and storage system which may be used to heat pressurised gas. It incorporates the heating system described above in FIG. 7.

The system of FIG. 8 comprises lens 80 disposed so as to focus solar energy on or near the surface of heat storage block 81. Heat storage block 81 is mounted on insulated mountings 82, and comprises a high heat capacity material such as carbon, or graphite, as described with reference to FIG. 7 above. Mounting 82 are constructed from a high strength insulating material. Suitable materials include ceramics such as fused alumina. Heat storage block 81 has a casing which comprises a copper/carbon composite or some similar material. Heat storage block 81 has solar energy receiver 83 (on or near the surface of which lens 80 is focussed) for receiving solar energy. Receiver 83 is commonly made from pure crystalline graphite, with a purity of at least about 99>, optionally >99.5 or 99.9%, on a w/w basis. Heat transfer bridge 84, as described with reference to FIG. 7 above, is provided to transfer heat from heat storage block to slave block 85. Heat transfer piping system 86 is set into slave block 85, as described with reference to FIG. 7 above. Slave block 85 is mounted on insulated mountings 87 to minimise conductive heat losses from slave block 87. Temperature control system 88 is provided to control the heat transfer from heat storage block 81 to slave block 85, as described with reference to FIG. 7 above. Heat storage block 81, slave block 85 and heat transfer bridge 84 are all located within vacuum chamber 89, which is surrounded by insulation 90 so as to minimise unwanted heat transfers from these components.

Operation of the system of FIG. 8 is largely as described in connection with FIG. 7. Solar energy is collected by lens 80, which delivers concentrated solar energy to solar energy receiver 83 of block 81. Thermal energy accumulates in block 81, thereby raising its temperature. The thermal energy of block 81 is transferred by means of bridge 84 to slave block 85. Slave block 85 is maintained at or about a desired temperature by means of temperature control system 88, which raises bridge 84 so as to break the thermal connection between storage block 81 and slave block 85 when the temperature of slave block 85 rises above the desired temperature, and lowers bridge 84 so as to re-establish the thermal connection when the temperature of slave block 85 drops below the desired temperature. Slave block 85 transfers heat energy to a heat transfer fluid which passes through heat transfer piping system 86 so as to heat the heat transfer fluid. The heat transfer fluid may for example be the compressed gas which is used in FIG. 6 for running motor 45.

Figure 9:
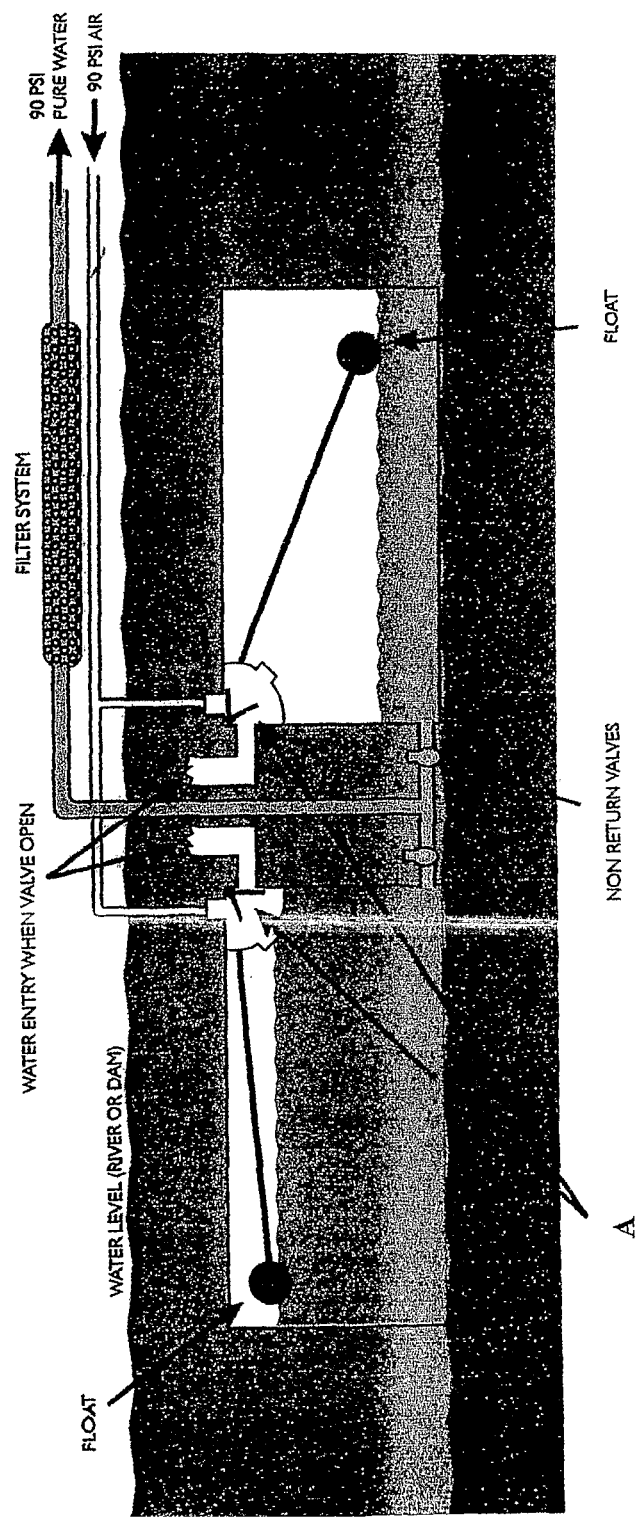
FIG. 9 is a diagram of a pumping system for providing purified water.

FIG. 9 shows a water supply system according to the present invention. In FIG. 9, A indicates double acting valve systems controlling water in when tank is empty and air at 70 psi when tank is full. Note that when tank is empty the air valve closes and the water valve opens—first the pressure air in empty tank is released and in doing so cleans water entry tube screen. In FIG. 9, compressed air is provided by a device as described previously (not shown in FIG. 9). The compressed air is supplied to two pressure vessels which are located below the surface of a body of water, e.g. a dam, lake, river etc. In the condition shown in FIG. 9, the air valve leading to the left hand tank is open, allowing compressed air to enter that tank. This valve is coupled to a water entry valve, so that when the air valve is open, the water entry valve is closed, preventing water entering that tank. Under pressure of the compressed air, the water in the left hand tank is then forced out of the tank through the-non-return valve to the filter system. It then passes out of the filter system as high pressure purified water. As this is occurring, the air valve to the right hand tank is closed and the water entry valve is open. This enables water from the body of water to enter and fill the right hand tank. Once the right hand tank is abut full and the left hand tank is about empty (as indicated by the float valves in the tanks), the air valve to the left hand tank will close and the water entry valve to the left hand tank will open, and the air valve to the right hand tank will open and the water entry valve to the right hand tank will close. This enables water to be pumped from the right hand tank through the non-return valve through the filter to generate purified water as described above for the left hand tank, while allowing the left hand tank to refill with water. This cycle may be repeated so as to provide a continuous supply of purified water. The availability of stored wind power generated compressed air as provided by the present invention makes it possible to use high pressure air to pump water at pressure without the need for electricity or diesel energy. Aspects of this include dual heavier than air water tanks weighted so that they remain submerged when full of air and fitted with a valve system that permits water from a darn or river to flow into the tanks by the special float valve system and bi-valve system to allow the water inlet valve to close arid the pressure air valve to open. This pressurises the water which passes through a non-return valve to an activated coal or silica filter to provide high pressure water to households, villages, farms etc. This is of particular importance to farm irrigation where unpolluted water is essential and is in short supply. Thus the system of FIG. 9 features in particular double acting valve systems. These allow water to enter the tank to which they are fitted when the tank is empty and allow air to enter to reach a predetermined pressure (e.g. about 70 psi) when the tank is full. Thus when a tank is empty, the air valve closes and the water valve opens. First the pressurised air in the empty tank is released and in doing so it cleans a water entry tube screen.

Figure 10:
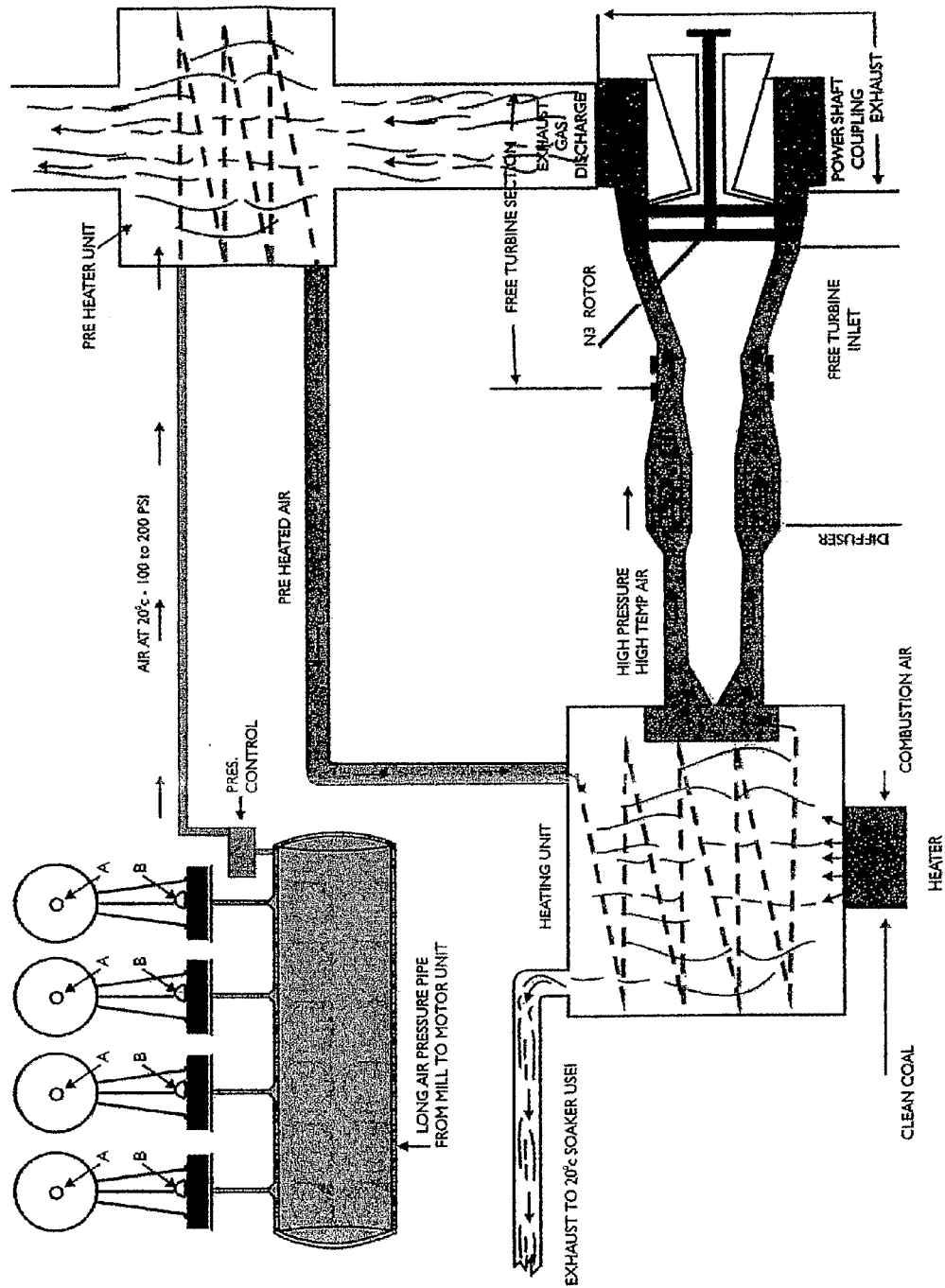
FIG. 10 is a diagram showing how the device of the present invention may be used to power a gas turbine.

FIG. 10 shows a system for operating a turbine according to the present invention. In FIG. 10, windmills A drive devices B which provide compressed air to the pressure vessel to which the devices are connected. The pressurised air is then passed to a preheater unit, where it is heated by heated air produced later in the process. It is then passed to a heater unit. In the heater unit, clean coal or some other suitable fuel is combusted so as to provide heat and a carbon dioxide rich atmosphere. This is used to heat the compressed and preheated air from the devices B. In doing so, the carbon dioxide rich atmosphere is cooled and may be discharged, or may be used to encourage growth of plants. The heated high pressure air is then passed to a turbine where the pressure of the air turns the turbine. The waste heated air generated thereby is returned to the preheater unit to preheat the compressed air as described above. In this manner, the wind energy harvested by the windmills is used for operating a turbine, which can then perform useful work.

Figure 11:
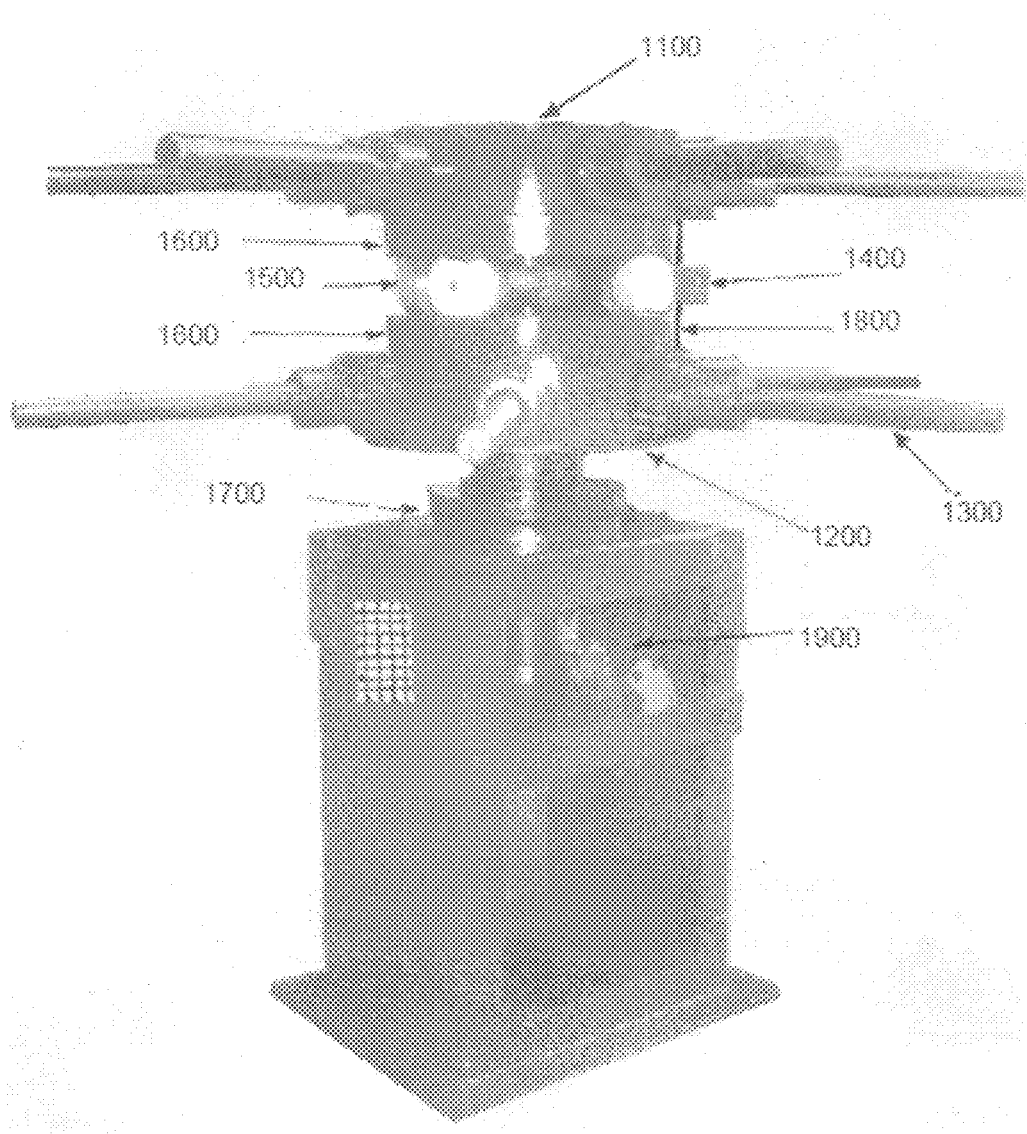
FIG. 11 is a photograph showing the mechanical operation of a windmill as described herein.

FIG. 11 shows the mechanical operation of a windmill as described herein. The mill is designed to operate at wind speeds of 0.4 m/second due to the fact that the blades when driven face the wind at 90° due to the positioning created by the tail of the windmill.

With reference to FIG. 11:

Item 1100 is the top rotating blade section (vane assembly) which is centred by non-lubricating bearings to the central shaft. This permits the top vane assembly to pass its energy to the lower blade drive section (vane assembly).

Item 1200 is the lower blade section is attached to the main drive shaft which permits it to turn from right to left whereas section number 1100 rotates left to right. This connection to the main shaft allows energy from both the lower and upper blade sections to transfer to the main shaft for use.

Item 1300 is the turbine blading driven shafts are transferring through 90 degrees due to a cam system (note shown) attached to the tail section and held in position by non-lubricating bearings.

Item 1400 is the wind tail direction unit attached to the cam system which independently allows, through the cam system, the controlling of the turning of the blade system to face the wind in line with the tail control of the windmill to face the wind.

Items 1500 are special non-lubricating rollers attached to the body of the windmill tail casting which allows the energy created by the upper blades section to be passed to the lower blade section.

Item 1600 is a windmill tail casting positioned by a non-lubricating bearing to the central shaft. It internally contains in both upper and lower bodies a cam system which is positioned facing the wind by the windmill tail section 1400 which controls their position.

Item 1700 is a rotating bearing system which can be mounted on the top of the windmill frame positioning to the wind.

Item 1800 is a cover system attached to the tail casting 1400 allowing for the protection of internal operating components and allowing for free rotation both left and right for the blade sections.

For control purposes a brake system 1900 may be attached to the drive shaft allowing for the control of the mill operation.

Figure 12:
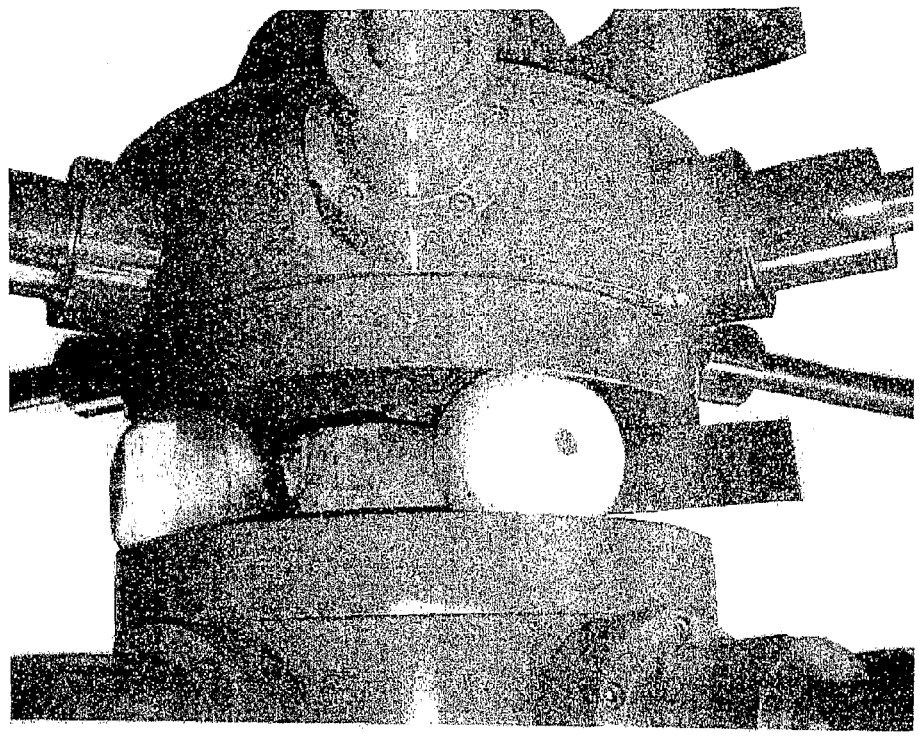
FIG. 12 shows a closer photograph of the head of the windmill shown in FIG. 11.

FIG. 12 shows a closer photograph of the head of the windmill shown in FIG. 11. In particular it shows the non-lubricated rollers that transfer rotational energy from the upper blade assembly to the lower blade assembly. Thus as the upper blade assembly rotates in a clockwise direction (as viewed from above) the rollers will rotate in an anticlockwise direction (as viewed towards the shaft), thereby driving the lower blade assembly in an anticlockwise direction (as viewed from above). As the windmill, in use, is providing energy, for example to a motor, a generator or similar, energy is withdrawn from the lower blade assembly by the shaft coupled to it, and this energy is then supplemented by energy from the upper blade assembly.

Figure 13:
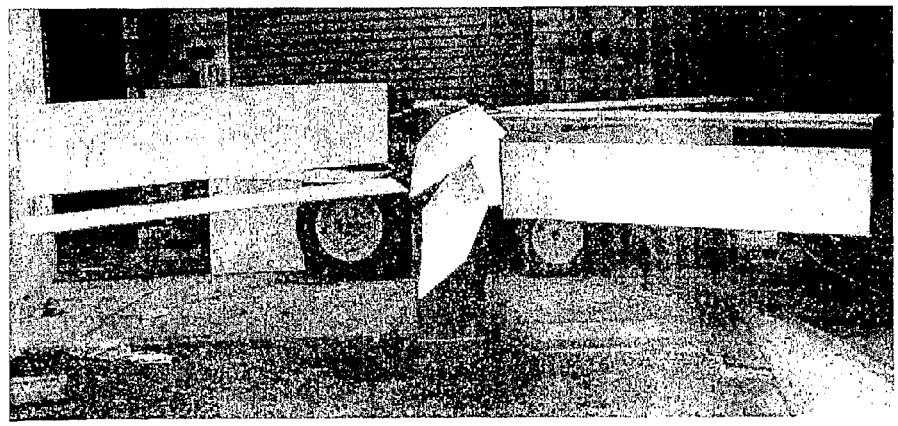
FIG. 13 shows a photograph of the windmill described herein and FIG. 13A shows a sketch of the windmill.

FIG. 13 shows a photograph of the windmill described herein. In the discussion below, the terms "upper", "lower", "left", "right" and "centre" (and "central") are taken to be with reference to the photograph as viewed. The windmill has two blade assemblies, an upper and a lower, which are configured to rotate in opposite directions. Thus the upper assembly is configured to rotate in a clockwise direction as viewed from above, and the lower assembly is configured to rotate in a counterclockwise direction as viewed from above. Thus the upper left blade (part of the upper blade assembly) is shown vertical, and capable of collecting energy from wind blowing into the plane of the photograph (i.e. away from the viewer) as it travels into the plane of the photograph. The upper right blade, also part of the upper blade assembly, is travelling out of the plane of the photograph and is oriented horizontally so as to present minimal area to the wind (blowing towards it) and hence minimal resistance to the wind. The upper central blade, shown at an angle of about 45° to vertical, is rotating about its axis, from horizontal to vertical, so that as it moves towards the left of the photograph it will be capable of collecting wind energy. A fourth blade of the upper assembly, not visible in FIG. 13, is located at the back of the windmill, and is also at an angle of about 45° to vertical, rotating from vertical to horizontal so that, as it returns into the wind, it presents minimal area to the wind. The lower assembly operates in a similar fashion but in reverse. Thus the assembly is configured to rotate in a counterclockwise fashion when viewed from above. The lower right blade is shown vertical so as to maximise the area presented to the wind as it travels into the plane of the photograph and thereby maximise the energy collected from the wind. The lower left blade is shown horizontal so as to minimise its resistance to the wind as it returns out of the plane of the photograph. The lower centre blade is shown transitioning between horizontal and vertical, so that once it rotates further so as to travel into the plane of the paper it will present a large surface area to the wind, and a fourth lower blade (not visible in the photograph) is transitioning from vertical to horizontal so that, once it rotates further so as to travel out of the plane of the paper, it presence minimal resistance to the wind. The coupling shown in FIG. 12 transfers energy from the upper assembly to the lower assembly, so that the lower assembly can use the combined energy of the upper assembly together with the energy it collects itself from the wind to rotate the shaft of the windmill (which is housed below the blades and is not visible in FIG. 13, however is shown in FIG. 11). This may for example be used to run a turbine for generating electricity.

Figure 13A:
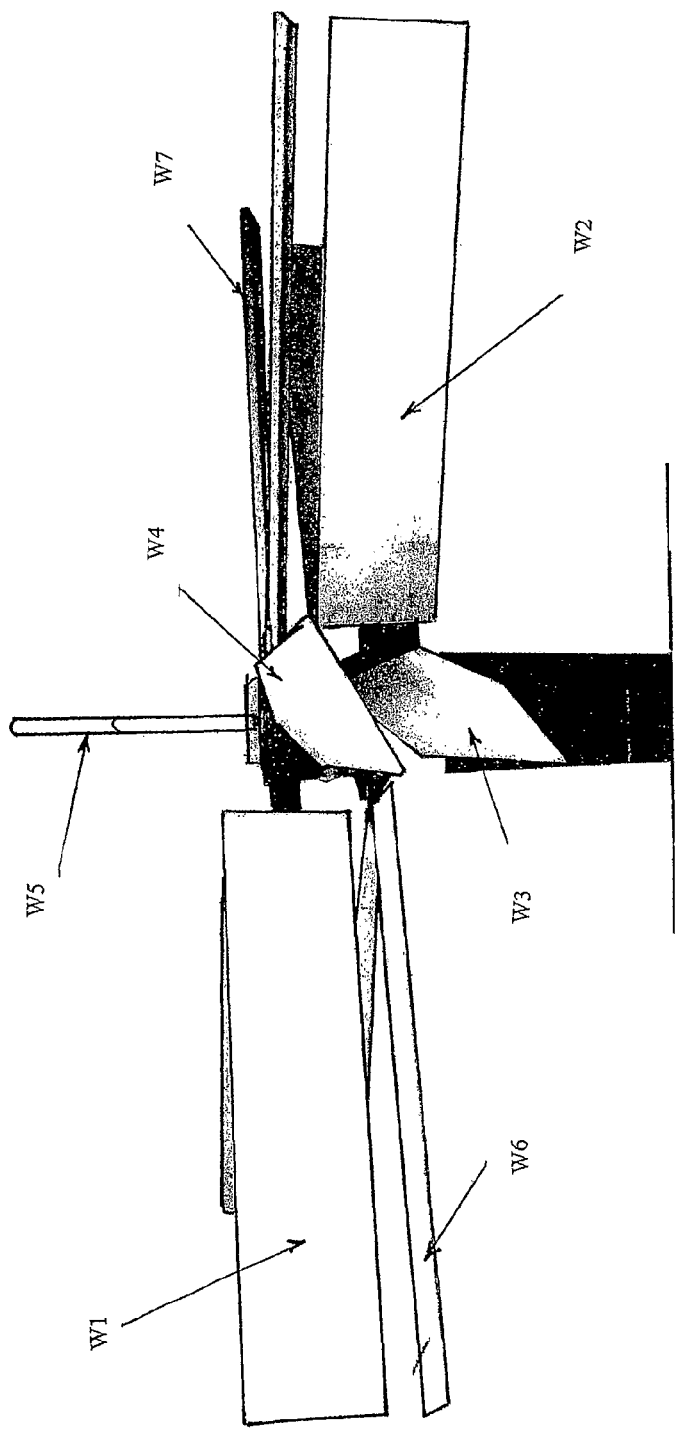

FIG. 13A shows a sketch of the windmill shown in the photograph of FIG. 13. With reference to FIG. 13A:

W1 is a left hand blade (vane) facing the front of the mill, which after passing the right hand blade of the front, by the action if the tail W5 faces the wind at 90 degrees, therefore travelling close to wind speed;

W2 is a right hand blade which repeats W1, however travelling in reverse direction due to the drive system between the main body units (vane assemblies);

W3 and W4 are held by tail W5 so that the mill faces into the wind: the left and right hand rotational blades pass each other quickly to resume their positions at 90 degrees to the wind.

W6 and W7: when the right and left driving blades reach the back of the mill, which is at the tail position, each turns 90 degrees allowing them to pass in opposite directions to be driven into the wind to the front of the mill, where they are rotated as described above for W3/W4.

It should be noted that the blades are designed with the sharp edge facing the wind on the return stroke, cutting the wind so that by the angle of the reverse sides any wind will be directed to the 90 degree blades W1 and W2. Since the two vane assemblies are counterrotating, a blade of the top assembly will pass a blade of the bottom assembly when the two blades are at right angles (since one will be travelling into the wind and one will be travelling with the wind). This enables the two assemblies to be located close together and improves the compactness of the windmill blades.

Figure 14:
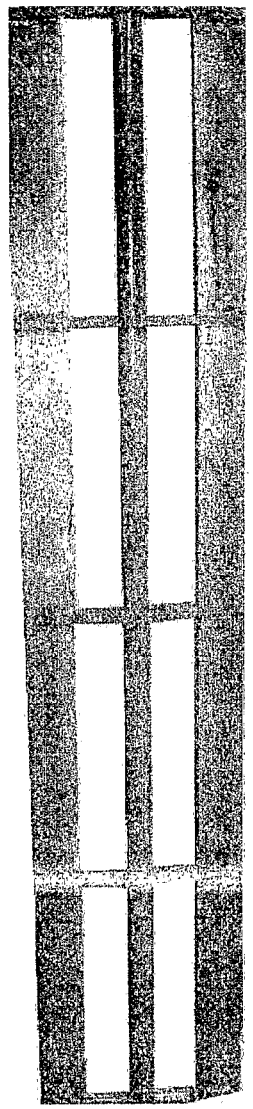
FIG. 14 shows a suitable frame for a blade for use in the windmill.

FIG. 14 shows a suitable frame for a blade for use in the windmill. This may be coated with a lightweight material (fabric, polymer reinforced paper, polymeric film or similar) to form the blade. This enables the weight of the blade to be minimised so as to reduce the minimum wind energy required to start operation of the windmill. FIG. 14 also shows the shape of the blade, which approximates an aerofoil. This is commonly used so as to direct wind from a returning blade (which is shown horizontal in FIG. 13) towards an advancing blade so as to increase the efficiency of the windmill. Thus for example with reference to FIG. 13, the upper right blade is coming out of the plane of the photograph. Its inverted aerofoil shape directs air downwards so as to increase the amount of air impacting on the lower right blade which is travelling into the plane of the photograph. Similarly the aerofoil shape of the lower left blade, also coming out of the plane of the photograph, directs air upwards towards the upper left blade so as to provide additional energy to the upper blade assembly. This enables air impacting returning (horizontal) blades to be used efficiently rather than providing retardation.

The invention claimed is:

1. A device for generating high pressure air, said device comprising:
   a rotor capable of rotating about an axis of rotation under the influence of wind energy;
   a block having an external surface and an internal surface, said internal surface defining an internal cavity in said block, whereby the rotor is located inside said cavity and is capable of rotating within the cavity, and said block being capable of moving relative to the rotor in a direction orthogonal to the axis of rotation of the rotor so as to vary the position of the rotor within the cavity;
   a plurality of vanes extending from said rotor, said vanes being coupled to the rotor in such a manner that, in every position that the block is capable of adopting relative to the rotor, the rotor is capable of rotating within the cavity while maintaining continuous contact between each vane and the internal surface of the block so as to maintain a seal between the internal surface and the vane;
   a gas inlet channel extending from the external surface of the block to the internal cavity so as to permit a gas to enter the cavity;
   a gas outlet channel on an opposite side of the block to the gas inlet channel, said gas outlet channel extending from the internal cavity to the external surface of the block so as to permit the gas to exit the cavity;
   a guide constraining the motion of the block to the direction orthogonal to the axis of rotation of the rotor; and
   a position controller for causing the block to move relative to the rotor so as to vary the position of the rotor within the cavity;
   wherein the block is coupled to the guide; and
   wherein the guide comprises a housing which has an outside surface and an inside surface, said inside surface defining a chamber inside which the block is located, wherein the shape of said chamber is such that the inside surface constrains the motion of the block to the direction orthogonal to the axis of rotation of the rotor, said housing having a housing inlet channel extending from the outside surface of the block to the chamber and a housing outlet channel on an opposite side of the housing to the housing inlet channel, said housing outlet channel extending from the chamber to the outside surface so that, in every position that the block is capable of adopting relative to the rotor, said housing inlet channel at least partially aligns with the gas inlet channel so as to permit a gas to enter the cavity and said housing outlet channel at least partially aligns with the gas outlet channel so as to permit the gas to exit the cavity;
   said device additionally comprising a dewatering device for dewatering the gas prior to said gas entering the cavity.

2. The device of claim 1 wherein both the cavity and the rotor are cylindrical and the axis of the cavity is parallel to the axis of rotation of the rotor.

3. The device of claim 1 wherein the vanes are capable of at least partly retracting into the rotor.

4. The device of claim 1 wherein the vanes comprise a resilient material.

5. The device of claim 1 wherein the vanes are resiliently coupled to the rotor.

6. The device of claim 1 comprising a windmill wherein the rotor is coupled to the windmill so as to enable said rotor to rotate about the axis of rotation.

7. The device of claim 6 wherein the rotor is coupled to the windmill by means of a drive shaft which is coupled axially to the rotor.

8. The device of claim 1 wherein the position controller comprises a first position adjustor for moving the block so as to vary the position of the rotor within the cavity such that, when the pressure in the outlet channel is below a predetermined maximum, the distance between the axis of rotation of the rotor and the centre of the cavity increases with an increase in said pressure in the outlet channel.

9. The device of claim 8 whereby the first position adjustor urges the block in a first direction such that the distance between the axis of rotation of the rotor and the centre of the cavity increases and the position controller comprises a second position adjustor which urges the block in a second direction which is opposite to the first direction, such that the first and second position adjustors operate in opposition to one another such that, when the pressure in the outlet is below a predetermined maximum, the distance between the axis of rotation of the rotor and the centre of the cavity increases with an increase in said pressure in the outlet; said second position adjustor being a spring or a compressible gas piston.

10. The device of claim 8 wherein the position controller comprises a tube which couples the outlet channel to the first position adjustor for providing a gas pressure to the first position adjustor so as to control said first position adjustor.

11. The device of claim 1 wherein the outlet channel comprises a pressure regulator for setting a maximum outlet gas pressure from the device.

12. The device of claim 1 wherein the guide is in a fixed position relative to the axis of rotation of the rotor.

13. The device of claim 1 comprising an inlet pipe and an outlet pipe, said inlet pipe being in gas communication with the gas inlet channel and said outlet pipe being in gas communication with the gas outlet channel.

14. A pressurised fluid source comprising a device according to claim 1 and a pressure vessel, whereby the gas outlet channel of said device is coupled to an internal space of said pressure vessel so as to permit pressurised gas from the device to enter the internal space.

15. The pressurised fluid source of claim 14 wherein the pressure vessel comprises a liquid inlet for supplying a liquid to an internal space of the pressure vessel, a liquid outlet for allowing the liquid to exit the pressure vessel and at least one valve for controlling the exit of fluid from the pressure vessel, so that the pressurised fluid source is a source of the liquid under pressure.

16. The pressurised fluid source of claim 14 comprising a first and a second pressure vessel, whereby the gas outlet channel of said device is coupled via a valve to an internal space of each of said pressure vessels so as to permit pressurised gas from the device to enter the internal space of either the first or the second pressure vessel according to a setting of the valve.

17. The pressurised fluid source of claim 16 wherein each pressure vessel comprises a liquid inlet for supplying a liquid to an internal space of said pressure vessel, a liquid outlet for allowing the liquid to exit the pressure vessel and at least one valve for controlling the exit of fluid from the pressure vessel, so that the pressurised fluid source is a source of the liquid under pressure.

18. The pressurised fluid source according to claim 14 additionally comprising a heater for heating the internal space of said pressure vessel, or at least one of the internal spaces of said pressure vessels.

19. The pressurised fluid source according to claim 14 additionally comprising a heater for heating a liquid or gas after said liquid or gas has exited the pressure vessel(s).

20. A motor comprising:
a) an engine capable of being run by means of a pressurised fluid and
b) a pressurised fluid source according to claim 14, said engine being coupled to the pressurised fluid source so as to provide pressurised fluid to the engine.

21. A water supply system comprising a pressurised fluid source according to claim 15 and a pressure driven water purification device, wherein the liquid outlet(s) is (are) coupled to the pressure driven water purification device, said pressure driven water purification device being selected from the group consisting of reverse osmosis, activated carbon adsorption, filtration, microfiltration, ultrafiltration and combinations of any two or more of these.

22. The water supply system of claim 21 wherein the water purification system comprises an activated carbon filter, an activated silica filter, a reverse osmosis device, an ultrafiltration device, a microfiltration device or a combination of any two or more of these.

23. A method for operating a device according to claim 1, said method comprising allowing wind energy to cause the rotor to rotate, thereby causing the vanes to propel a gas from the gas inlet channel to the gas outlet channel and thereby compress said gas.

24. The method of claim 23 wherein said device comprises a windmill and wherein the rotor of the device is coupled to said windmill so as to enable said rotor to rotate about the axis of rotation, wherein the step of allowing wind energy to cause the rotor to rotate comprises exposing said windmill to wind, thereby causing the rotor to rotate about the axis of rotation.

25. A method of operating a pressurised fluid source according to claim 14 comprising:
allowing wind energy to cause the rotor to rotate, thereby causing the vanes to propel a gas from the gas inlet channel to the gas outlet channel and thereby compress said gas; and
passing the compressed gas to the internal space of the pressure vessel.

26. The method of claim 25 additionally comprising heating the compressed gas.

27. A method of operating a motor according to claim 20, said method comprising:
allowing wind energy to cause the rotor to rotate, thereby causing the vanes to propel a gas from the gas inlet channel to the gas outlet channel and thereby compress said gas;
passing the compressed gas to the internal space of the pressure vessel; and
passing the compressed gas from the pressure vessel to the engine so as to operate the motor.

28. A method for providing water, said method comprising:
providing a water supply system according to claim 21;
admitting water to the pressure vessel of said system;
allowing wind energy to cause the rotor to rotate, thereby causing the vanes to propel a gas from the gas inlet channel to the gas outlet channel and thereby compress said gas;
passing the compressed gas to the internal space of the pressure vessel so as to pressurise the water in said pressure vessel; and
allowing the pressurised water to pass out of the pressure vessel and through the pressure driven water purification device.

29. A windmill for collecting wind energy comprising:
a rotatable shaft;
a first vane assembly disposed circumferentially around said shaft and coupled to said shaft such that rotation of the first vane assembly causes rotation of the shaft, wherein the first vane assembly comprises:
at least one vane, the or each vane having an axis which extends outwardly from the shaft; and
a rotation mechanism such that when a vane of the first vane assembly rotates through a first position said vane rotates about its axis so that the vane is in a substantially vertical plane and when said vane rotates through a second position it rotates about its axis by about 90°, wherein the first and second positions are located approximately 180° apart around the shaft; and
a second vane assembly coupled to the first vane assembly, said second vane assembly comprising at least one second assembly vane having an axis which extends outwardly from an axis of rotation of said second vane assembly, and a rotation mechanism such that when a vane of the second vane assembly rotates through a third position said vane rotates about its axis so that the vane is in a substantially vertical plane and when said vane rotates through a fourth position it rotates about its axis by about 90°, wherein the third and fourth positions are located approximately 180° apart around the shaft, wherein the coupling of the second vane assembly to the first vane assembly is such that rotation of the second vane assembly transfers energy to the shaft, and wherein the vane(s) of the first vane assembly have a cross-section in the shape of an aerofoil and/or the vane(s) of the second vane assembly have a cross-section in the shape of an inverted aerofoil so that rotation of the first vane assembly directs air upwards towards the second vane assembly and/or rotation of the second vane assembly directs air downwards towards the first vane assembly.

30. The windmill of claim 29 wherein the axis of the or each vane is substantially orthogonal to the shaft.

31. The windmill of claim 29 wherein the rotation mechanism is coupled to a region of each vane at or near a proximal end of said vane.

32. The windmill of claim 29 wherein the rotation mechanism comprises a cam.

33. The windmill of claim 29 wherein, in use, the vane assembly rotates in a plane substantially parallel to the wind direction.

34. The windmill of claim 33 wherein the plane of rotation of the vane assembly is substantially horizontal.

35. The windmill of claim 29 additionally comprising a direction unit capable of detecting the wind direction and of rotating at least a portion of the windmill so that each vane when travelling in a leeward direction is located in a substantially vertical plane and when travelling in a windward direction lies in a plane substantially orthogonal to said substantially vertical plane.

36. The windmill of claim 35 wherein the direction unit comprises a wind vane.

37. The windmill of claim 29 wherein the second vane assembly is located substantially parallel to and coaxially with the first vane assembly.

38. The windmill of claim 37 wherein the planes of rotation of the first and second vane assemblies are substantially parallel.

39. The windmill of claim 29 wherein the second vane assembly is coupled to the first vane assembly by means of a coupling for transferring rotational energy from the second vane assembly to the first vane assembly and is capable of rotating in an opposite direction to the first vane assembly.

40. The windmill of claim 39 wherein the coupling comprises one or more rollers and/or one or more cogwheels.

41. The windmill of claim 29 wherein the rotation mechanism of the second vane assembly comprises a cam.

42. The windmill of claim 29 wherein the first vane assembly has at least two vanes, said at least two vanes being distributed symmetrically around the shaft.

43. The windmill of claim 29 wherein the second vane assembly has at least two vanes, said at least two vanes being distributed symmetrically around its axis of rotation.

44. The windmill of claim 29 wherein the shaft is coupled to a generator for generating electricity.

45. The device of claim 1 comprising a windmill, wherein the rotor is coupled to said windmill, said windmill comprising:

a rotatable shaft;

a first vane assembly disposed circumferentially around said shaft and coupled to said shaft such that rotation of the first vane assembly causes rotation of the shaft, wherein the first vane assembly comprises:

at least one vane, the or each vane having an axis which extends outwardly from the shaft; and a rotation mechanism such that when a vane of the first vane assembly rotates through a first position said vane rotates about its axis so that the vane is in a substantially vertical plane and when said vane rotates through a second position it rotates about its axis by about 90°, wherein the first and second positions are located approximately 180° apart around the shaft; and a second vane assembly coupled to the first vane assembly, said second vane assembly comprising at least one second assembly vane having an axis which extends outwardly from an axis of rotation of said second vane assembly, and a rotation mechanism such that when a vane of the second vane assembly rotates through a third position said vane rotates about its axis so that the vane is in a substantially vertical plane and when said vane rotates through a fourth position it rotates about its axis by about 90°, wherein the third and fourth positions are located approximately 180° apart around the shaft, wherein the coupling of the second vane assembly to the first vane assembly is such that rotation of the second vane assembly transfers energy to the shaft, and wherein the vane(s) of the first vane assembly have a cross-section in the shape of an aerofoil and/or the vane(s) of the second vane assembly have a cross-section in the shape of an inverted aerofoil so that rotation of the first vane assembly directs air upwards towards the second vane assembly and/or rotation of the second vane assembly directs air downwards towards the first vane assembly;

such that rotation of the shaft causes rotation of the rotor.

46. A pressurised fluid source comprising a device according to claim 45 and a pressure vessel, whereby the gas outlet channel of said device is coupled to an internal space of said pressure vessel so as to permit pressurised gas from the device to enter the internal space.

47. A motor comprising:

a) an engine capable of being run by means of a pressurised fluid and b) a pressurised fluid source according to claim 46, said engine being coupled to the pressurised fluid source so as to provide pressurised fluid to the engine.

48. A water supply system comprising a pressurised fluid source according to claim 46 and a pressure driven water purification device, wherein the liquid outlet(s) is (are) coupled to the pressure driven water purification device.

49. A cooling device comprising a pressurised fluid source according to claim 46 and a heat removal device for removing heat from compressed gas in the pressure vessel(s), and also comprising one or more gas outlets for allowing cooled compressed gas to exit the pressure vessel(s) and expand.

50. A method for operating a device according to claim 45, said method comprising exposing the vane assembly of the windmill of said device to wind so as to cause said vane assembly to rotate about the shaft, thereby causing the rotor to rotate and causing the vanes to propel a gas from the gas inlet channel to the gas outlet channel and thereby compress said gas.

51. A method of operating a pressurised fluid source according to claim 46 comprising:

exposing the vane assembly of the windmill of said pressurised fluid source to wind so as to cause said vane assembly to rotate about the shaft, thereby causing the rotor to rotate and causing the vanes to propel a gas from the gas inlet channel to the gas outlet channel and thereby compress said gas; and passing the compressed gas to the internal space of the pressure vessel.

52. A method of operating a motor according to claim 47, said method comprising:
- exposing the vane assembly of the windmill of said motor to wind so as to cause said vane assembly to rotate about the shaft, thereby causing the rotor to rotate and causing the vanes to propel a gas from the gas inlet channel to the gas outlet channel and thereby compress said gas;
- passing the compressed gas to the internal space of the pressure vessel; and
- passing the compressed gas from the pressure vessel to the engine so as to operate the motor.

53. A method for providing water, said method comprising:
- providing a water supply system according to claim 48;
- admitting water to the pressure vessel of said system;
- exposing the vane assembly of the windmill of said water supply system to wind so as to cause said vane assembly to rotate about the shaft, thereby causing the rotor to rotate and the vanes to propel a gas from the gas inlet channel to the gas outlet channel and thereby compress said gas;
- passing the compressed gas to the internal space of the pressure vessel so as to pressurise the water in said pressure vessel; and
- allowing the pressurised water to pass out of the pressure vessel and through the pressure driven water purification device.

54. A method for providing cool air comprising:
- providing a cooling device according to claim 49;
- exposing the vane assembly of the windmill of said device to wind so as to cause said vane assembly to rotate about the shaft and causing the rotor to rotate and the vanes to propel a gas from the gas inlet channel to the gas outlet channel and thereby compress said gas;
- passing the compressed gas to the internal space of the pressure vessel;
- removing heat from said compressed gas using the heat removal device;
- opening at least one of the one or more gas outlets so as to allow the cooled compressed gas to exit the pressure vessel through said opened outlet(s), thereby allowing the gas to expand and cool.

* * * * *